(12) United States Patent
Baugh et al.

(10) Patent No.: US 8,426,529 B2
(45) Date of Patent: *Apr. 23, 2013

(54) ETHYLENE/DICYCLOPENTADIENE COPOLYMERS AND FUNCTIONALIZED DERIVATIVES THEREOF

(75) Inventors: Lisa Saunders Baugh, Ringoes, NJ (US); Abhimanyu Onkar Patil, Westfield, NJ (US); Christian Peter Mehnert, Houston, TX (US); Kevin R. Squire, Kingwood, TX (US); Kenneth A. Cook, La Marque, TX (US); Caiguo Gong, Pearland, TX (US); Enock Berluche, Phillipsburg, NJ (US); Karla Schall Colle, Houston, TX (US); Alan J. Oshinski, Friendswood, TX (US); Stephen Zushma, Clinton, NJ (US); Beverly J. Poole, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 819 days.

This patent is subject to a terminal disclaimer.

(21) Appl. No.: 11/801,633

(22) Filed: May 10, 2007

(65) Prior Publication Data

US 2008/0015314 A1 Jan. 17, 2008

Related U.S. Application Data

(60) Provisional application No. 60/831,033, filed on Jul. 14, 2006.

(51) Int. Cl.
| | |
|---|---|
| C08F 8/04 | (2006.01) |
| C08F 8/08 | (2006.01) |
| C08F 236/20 | (2006.01) |
| C08F 232/06 | (2006.01) |

(52) U.S. Cl.
USPC ........ 525/332.1; 525/210; 525/211; 525/338; 525/386; 525/387; 525/383; 526/283; 526/160; 526/170; 526/134

(58) Field of Classification Search ............... 525/210, 525/211, 332.1, 338, 383, 386, 387; 526/283, 526/160, 170, 134
See application file for complete search history.

(56) References Cited

U.S. PATENT DOCUMENTS

| | | | |
|---|---|---|---|
| 3,330,794 | A | 7/1967 | Gallagher |
| 5,008,356 | A | 4/1991 | Ishimaru et al. |
| 5,422,185 | A | 6/1995 | Egami et al. |
| 6,191,243 | B1 | 2/2001 | Nitta et al. |
| 6,388,032 | B1 | 5/2002 | Yamaura et al. |
| 6,469,117 | B1 | 10/2002 | Kuang et al. |
| 6,476,153 | B2 * | 11/2002 | Hashidzume et al. ..... 525/331.7 |
| 6,569,800 | B2 | 5/2003 | Takemori et al. |
| 6,627,714 | B2 | 9/2003 | Yamamoto et al. |

FOREIGN PATENT DOCUMENTS

| | | |
|---|---|---|
| EP | 0 283 164 | 9/1988 |
| EP | 0 964 005 | 12/1999 |
| EP | 1 028 128 | 8/2000 |
| EP | 1 266 937 | 12/2002 |
| JP | 63243103 | 10/1988 |
| JP | 63314220 | 12/1988 |
| JP | 04189806 | 7/1992 |
| JP | 04272937 | 9/1992 |
| JP | 04283245 | 10/1992 |
| JP | 3301448 | 6/1994 |
| JP | 06271617 | 9/1994 |
| JP | 3353795 | 3/1995 |
| JP | 07070250 | 3/1995 |
| JP | 2000017015 | 1/2000 |
| JP | 2000038414 | 2/2000 |
| JP | 2000119328 | 4/2000 |
| JP | 2001031716 | 2/2001 |
| JP | 2001329016 | 11/2001 |
| JP | 2002302518 | 10/2002 |
| JP | 2003328618 | 11/2003 |
| WO | WO 98/33830 | 8/1998 |
| WO | WO 03/050148 | 6/2003 |
| WO | WO 2006/004068 | 1/2006 |

OTHER PUBLICATIONS

Li et al., Macromolecules 38 (2005) 6767-6769.*
Supporting Information for Li et al., Macromolecules 38 (2005) 6767-6769.*
Hou et al., Journal of Organometallic Chemistry 691 (2006) 3114-3121.*
Hou et al., "Cationic rare earth metal alkyls as novel catalysts for olefin polymerization and copolymerization," Journal of Organometallic Chemistry 2006, vol. 691, 3114-3121.
Hou, Z., "Half-Sandwich Rare Earth Metal Catalysts for Olefin Polymerization and Copolymerization," J. Synth. Org. Chem., Jpn. 2005, 63, 1124-1136.
Li et al., "Scandium-Catalyzed Copolymerization of Ethylene with Dicyclopentadiene and Terpolymerization of Ethylene, Dicyclopentadiene, and Styrene," Macromolecules 2005, 38, 6767-6769.
Naga et al., "Synthesis and properties of polyethylene and polypropylene containing hydroxylated cyclic units in the main chain," Polymer 2006, 47, 520-526.

(Continued)

Primary Examiner — Roberto Rabago
(74) Attorney, Agent, or Firm — Darryl M. Tyus; Catherine L. Bell

(57) ABSTRACT

Disclosed is a selected type of copolymer composition comprising copolymers having units derived from ethylene and dicyclopentadiene (DCPD) co-monomers. Such copolymer compositions: a) have a DCPD-derived comonomer unit content of from about 25 mole % to about 45 mole %; b) have a Weight Average Molecular Weight, $M_w$, of greater than about 170,000; c) comprise amorphous material and have glass transition temperatures, $T_g$, of from about 8° C. to about 129° C., which also fit the equation $T_g$ (in ° C.)≥[(mole % DCPD× 3.142)−4.67]; and d) comprise no significant amount of crystalline polyethylene homopolymer or crystallizable polyethylene segments within the ethylene-dicyclopentadiene copolymers. Such copolymers can be readily derivatized by hydrogenation and/or epoxidation to provide polymeric materials suitable for use as engineering thermoplastics. Also disclosed are processes for preparing and optionally further derivatizing ethylene/dicyclopentadiene copolymers having the characteristics hereinbefore described.

35 Claims, No Drawings

OTHER PUBLICATIONS

Patil, "Functional Polyolefins," Chemical Innovation, May 2000, 30(5), 19-24.

Schnecko et al., "Copolymers of Ethylene with Bicyclic Dienes," Angewandte Makromolekulare Chemie 1971, 20, 141-152.

Simanke et al., "Ethylene Copolymerization with Cyclic Dienes Using rac-Et[Ind]$_2$ZrCl$_2$—Methylaluminoxane," Journal of Polymer Science: Part A: Polymer Chemistry 2002, vol. 40, 471-485.

Suzuki et al., "Synthesis and Functionalization of Poly(ethylene-co-dicyclopentadiene)," Journal of Applied Polymer Science 1999, vol. 72, 103-108.

Sung, J.A. et al. "*Copolymerization of 5,6-Dihydrodicyclopentadiene and Ethylene*" Macromolecules 2008, 41, pp. 4055-4057.

Kei Nishii et al., Highly Active Copolymerization of Ethylene and Dicyclopentadiene with [($\eta^1$-t-BuN)SiMe2($\eta^1$-C$_{29}$H$_{36}$)]TiMe$_2$(THF) Complex, The Chemical Society of Japan, Chemical Letters, 2008, vol. 37, No. 6, pp. 590-591.

* cited by examiner

ETHYLENE/DICYCLOPENTADIENE COPOLYMERS AND FUNCTIONALIZED DERIVATIVES THEREOF

CROSS-REFERENCE TO RELATED APPLICATIONS

This application claims the benefit of priority to U.S. Provisional Patent Application No. 60/831,033, filed Jul. 14, 2006, the disclosure of which is incorporated by reference.

FIELD OF THE INVENTION

This invention relates to preparation of certain copolymers of ethylene and dicyclopentadiene. Such copolymers can be functionalized or hydrogenated and used as structural polyolefins.

BACKGROUND OF THE INVENTION

Identification of polyolefin-based materials which function equivalently to conventional engineering thermoplastics (ETPs) for structural applications, particularly as automotive materials, would be commercially and economically advantageous. Polyolefins possessing the necessary properties to function as ETPs could compete against existing ETP materials (polycarbonates, polyurethanes, styrene-acrylonitrile and styrene-acrylonitrile-butadiene copolymers, etc.) in terms of price vs. performance. The development of such "structural polyolefins" (SPOs) would thus be highly desirable.

Ethylene-dicyclopentadiene copolymers (EDCPDs) are attractive as a potential basis for development of SPOs. It is possible to tailor the properties of such copolymers by means of appropriate selection of polymerization catalysts. EDCPD materials are typically amorphous materials possessing good optical properties and relatively high glass transition temperatures ($T_g$s). Many thermal and mechanical properties for neat EDCPDs and other cyclic olefin copolymers (COCs) are competitive with those of commercial ETPs and polypropylene-based materials.

EDCPD copolymers offer the unique advantage, as compared to PP-based materials and COC materials based on monoolefinic comonomers such as norbornene, of facile property adjustment, alteration and tailoring by means of post-polymerization chemical derivatization (hydrogenation, epoxidation or other functionalization, etc., with or without ring opening) of the pendant DCPD cyclopentenyl double bond which remains in the chemical structure after the copolymer is formed. Functionalization can be used to improve and tune resin properties such as compatibility with other polymers, paintability, adhesion, and filler interactions in compounding. Ethylene-DCPD copolymers are therefore attractive as potential novel ETPs for a number of reasons.

It is desirable for EDCPD copolymers which are to ultimately be used to prepare structural polyolefins to have relatively high $T_g$ values. Generally speaking, the $T_g$ of a polymeric material is the temperature below which the molecules in its amorphous phase have very little mobility. On a macroscopic scale, polymers are rigid below their glass transition temperature but can undergo plastic deformation above it. Thus, it is desirable that a material utilized for structural applications where dimensional heat stability is required to have a $T_g$ sufficiently high to prevent plastic deformation at its use temperatures.

It is also desirable that $T_g$ values of such materials, while being sufficiently high for structural uses, are not needlessly high. Melt-processing and -blending techniques used to manipulate polymers and to fabricate molded articles, such as injection molding and extrusion, require heating of a polymer above its $T_g$ (in the case of an amorphous material) to allow the polymer to flow. For a semicrystalline polymer, heating above its melting point ($T_m$) to liquefy any crystalline domains is also required to form a processable polymer melt. At higher $T_g$ values for a polymer, higher processing temperatures are required, resulting in a greater use of energy and higher processing costs and also resulting in a greater risk of thermal decomposition of the polymer. It is therefore desirable to prepare polymers with $T_g$ values that are sufficiently high to permit dimensional stability over a desired temperature use range for a given structural application, yet remain low enough over the minimum required value that processing may be carried out at the lowest possible temperature. For the SPO materials of interest herein, $T_g$ values in the range of 85° C. to less than 130° C. are highly desirable, although temperatures above this range (up to 180° C.) are also desirable for certain functionalized materials.

It is also desirable that the $T_g$ value of a polymer may be adjusted in a predictable fashion by varying the polymer's microstructural features, since the desirable end use temperature ranges of structural materials vary according to application. In general, higher $T_g$s desirably widen the end use temperature range of a material, but undesirably add cost to material processing. Facile adjustment of $T_g$ allows for the selection of SPO materials exhibiting the best price versus performance balance for a particular end use application.

A wide variety of microstructural features may be used to influence the $T_g$ of a polymer or copolymer. In general, the $T_g$ values exhibited by EDCPD copolymers increase as the DCPD content of the copolymer increases. Nevertheless, even for a copolymer with a given DCPD content, it may be possible to further vary and control $T_g$ by adjusting various other structural characteristics. Such features as the nature of comonomer placement along the chain (sequence distribution and degree of random, alternating, or blocky character), tacticity, and stereoconfiguration characteristics of the comonomer (for example, endo-versus exo-DCPD units), and the like, can result in higher or lower $T_g$s for copolymers of the same compositional makeup. These structural characteristics can, in turn, be adjusted or changed by means of selecting appropriate copolymer preparation procedures. Thus, such factors as polymerization reaction conditions and the nature of the polymerization catalyst used can all play a role in determining copolymer structure and the resulting $T_g$ of such materials.

When considered over a range of compositions, the $T_g$s of copolymers possessing different microstructures may also exhibit different sensitivities to DCPD content, in the sense that decreasing or increasing the comonomer level by a given amount may produce larger or smaller changes in $T_g$. In order to prepare materials that best span a $T_g$ range of interest, it is desirable for small changes in comonomer content to provide relatively large changes in $T_g$. For example, a copolymer composition for which varying DCPD content over a range of 10 mole % produces a change in $T_g$ over a range of 30° C. would be more desirable than a copolymer composition for which varying DCPD content over a range of 10 mole % produces a change in $T_g$ over a range of only 5° C.

It is additionally desirable, for reasons of cost, for the relationship between $T_g$ and DCPD content to require a minimum amount of DCPD to achieve a certain $T_g$ or $T_g$ range. For example, other factors being equal, a copolymer composition that produces $T_g$s in a given desirable temperature range with only 15-20 mole % DCPD incorporated would be more desirable than a copolymer composition that gave $T_g$s in this identical temperature range at compositions of 45-50 mole % DCPD.

In addition to the proper selection of $T_g$ and optimal control of $T_g$ by microstructure and/or composition, the appropriateness of a certain polymer's use as an SPO material relies on other properties which are independent of $T_g$; for example, molecular weight, thermal stability to chemical decomposition, and miscibility with desired tougheners, fillers, etc. In particular, polymers with high molecular weights are desirable as compared to polymers with lower molecular weights, since such materials exhibit greater melt strengths and therefore superior processing capabilities. It is generally desirable to synthesize polymers having the highest possible weight average molecular weight ($M_w$) and/or number average molecular weight ($M_n$) achievable at a given composition. It is particularly desirable to synthesize copolymers having $M_w$s of at least 170,000 g/mol (as measured versus polystyrene standards by Gel Permeation Chromatography (GPC) analysis.

The synthesis of EDCPD copolymers using various metallocene or Ziegler-Natta catalysts is known, with a wide range of DCPD molar contents for the copolymers being disclosed. U.S. Pat. No. 6,191,243 discloses EDCPD copolymers useful in optical applications prepared using the zirconocene catalyst $\mu$-$(CH_3)_2C$(cyclopentadienyl)(9-fluorenyl)$ZrCl_2$ in conjunction with a borate or methylalumoxane activator. The microstructures of such copolymers are said to have a high level of ethylene-DCPD monomer alternation and to lack DCPD-DCPD dyad linkages and crystalline polyethylene segments. In the exemplified copolymers of the '243 patent, the DCPD content lies within the range of 36 mole % to 46 mole % and the $T_g$ lies within the range of 130° C. to 175° C., with $T_g$ generally increasing with increasing DCPD content. Additional comparative EDCPD copolymers were prepared using a $\mu$-$(CH_2CH_2)$bis(1-indenyl)$ZrCl_2$ or a $\mu$-$[(CH_3)_2Si]$bis(1-indenyl)$ZrCl_2$ catalyst, having DCPD contents of 35-45 mole % and $T_g$s of 130-158° C.

The '243 patent also describes the synthesis of a comparative copolymer material having an overall DCPD content of 32 mole % using the $\mu$-$(CH_3)_2C$(cyclopentadienyl)(9-fluorenyl)$ZrCl_2$ catalyst. However, this material is described as partially crystalline (exhibiting a melting transition, $T_m$, in its differential scanning calorimetry (DSC) spectrum) and containing a large fraction of toluene-insoluble material. The toluene-soluble fraction, for which composition was not reported, showed a broad, indefinite $T_g$ at about 114° C.

U.S. Pat. Nos. 6,476,153 and 6,232,407, European Patent Applications No. EP0964005 and EP1266937A1, and Japanese Patent Applications No. JP2000017015A and JP2001329016A also disclose the synthesis of EDCPD copolymers prepared using $\mu$-$(CH_3)_2C$(cyclopentadienyl)(9-fluorenyl)$ZrCl_2$. These materials have DCPD contents of about 43-46 mole % and $T_g$s of about 143° C.-157° C.

Additional catalyst systems have been utilized for the synthesis of similar EDCPD materials. Japanese Patent Applications JP2002302518A1 and JP2003328618A disclose the synthesis of EDCPDs having DCPD contents of 39-48 mole % using trichloro(cyclopentadienyl)titanium. The $T_g$s for the materials having 46-48 mole % DCPD range from 165-178° C. (no $T_g$ is reported for the 39 mole % material). U.S. Pat. No. 6,627,714 describes the preparation of EDCPD copolymers using various bridged bis(cyclopentadienyl)zirconium catalysts. In general, it is indicated in the '714 patent that the DCPD content in such copolymers may range from 1 mole % to 95 mole %. Specific copolymers are exemplified which range in DCPD content from 47.6 mole % to 59.0 mole %. No $T_g$s are reported for these materials. The weight average molecular weights ($M_w$s) of the copolymers from Gel Permeation Chromatography (GPC), where reported, range from 92,000 to 235,000; the number average molecular weights ($M_n$s) range from 48,420 to 130,560; and the polydispersity indices (PDI;=$M_w/M_n$) range from 1.7-1.9. The high $T_g$ and high transparency of such copolymers are said to be advantageous. These disclosed copolymers are useful in lenses, optical disks, optical fibers, etc. The '714 patent also discloses the synthesis of a copolymer having 29.9 mole % DCPD; however, this material is of significantly lower molecular weight than the higher-DCPD materials ($M_n$ 8,030; $M_w$ 49,000; PDI 6.1), and no $T_g$s is reported.

In summary, EDCPD copolymers having $\geq$35 mole % DCPD and $T_g$s of 130° C. are well-known in the art. However, in the art describing these high-DCPD, high-$T_g$ materials, attempts to prepare copolymers having lower DCPD contents have produced either materials of low molecular weight or materials containing significant portions of crystalline (homo-polyethylene) material as evidenced by lowered solubility of a portion of the sample. While small amounts of crystalline or homo-polyethylene material are not detrimental to the properties of an EDCPD copolymer overall, the presence of significant amounts can create problems with respect to phase homogeneity or lowered transparency within the structural polyolefins of interest. Such contamination also complicates characterization of the sample, leads to problems with sample fractionation during functionalization or solution processing, and, by obfuscating the true composition of the copolymer present, complicates the strategy of controlling $T_g$ by manipulating DCPD incorporation.

In some instances, EDCPD copolymers having relatively low DCPD contents have been made that exhibit no detectable $T_m$s, indicating that there is no significant crystallizable polyethylene homopolymer present. [It is noted that copolymers having very low DCPD contents can also exhibit $T_m$s arising from long crystallizable ethylene sequences; however, such materials have $T_g$s too low to be of interest for the structural uses described herein.] For example, in Naga et al; *Polymer* 2006, 47, 520-526 it is reported that with the use of a $\mu$-$(CH_2CH_2)$bis(1-indenyl)$ZrCl_2$ polymerization catalyst, completely amorphous ($T_m$-free) EDCPD materials with 24.8-30.5 mole % DCPD have been prepared. Such materials, however, have $T_g$s of from 65.4° C. to 71.3° C., which temperatures are too low to make such EDCPD materials useful as structural polyolefins. Similarly, Suzuki et al., J. Appl. Polym. Sci. 1999, 72, 103-108 discloses the synthesis of EDCPD copolymers having endo-DCPD contents of 13.2 mole % or less using either a bis(cyclopentadienyl)zirconium dichloride-, $\mu$-$(CH_2CH_2)$bis(1-indenyl)$ZrCl_2$—, or $\mu$-$Ph_2C$(cyclopentadienyl)(9-fluorenyl)$ZrCl_2$-based catalyst system. The $T_g$s of these materials are below 44° C.

Japanese Patent Application No. JP2001031716A discloses the use of the $\mu$-$(CH_2CH_2)$bis(1-indenyl)$ZrCl_2$ catalyst to prepare EDCPD copolymers having 16, 27, and 40 mole % DCPD and $T_g$s of, respectively, 38° C., 84° C., and 135° C. However, these materials are of only moderate molecular weights, with $M_w$s of 104,000-150,000 via GPC (versus polystyrene standards).

U.S. Pat. No. 6,627,714B1 also discloses the use of a $\mu$-$(CH_2CH_2)$bis(1-indenyl)$ZrCl_2$ catalyst to prepare copolymers having 38.3-49.5 mole % DCPD, although no $T_g$ or molecular weight characteristics are reported for these polymers. U.S. Pat. Nos. 6,569,800, 6,323,149, and 6,350,831 disclose the synthesis of an EDCPD copolymer having 24.1 mole % DCPD using an unbridged bis(cyclopentadienyl)zirconium catalyst. However, no $T_g$ or molecular weight information was reported for this material. U.S. Pat. No. 6,469,117 discloses the use of trichloro(cyclopentadienyl)titanium and mono(cyclopentadienyl)titanium alkoxide and -amide catalysts to prepare EDCPDs having 3.0-18.7 mole % DCPD, also with no $T_g$ or molecular weight information. U.S. Pat. No. 6,469,117 and U.S. Published Patent Application No. 2003/065118 describe EDCPD copolymers useful in optical applications prepared using monocyclopentadienyl titanium alkoxide and amide complexes as catalysts. Exemplified copolymers have very low DCPD contents, ranging from 12.6 wt % to 52.1 wt % (3.2 mole % to 18.7 mole %); no $T_g$ or molecular weight values are reported.

In summary, considering the known catalytic systems based on titanium and zirconium complexes utilized to prepare EDCDPD copolymers, there are no known copolymers derived from these systems which are free from significant contamination with crystalline homopolymer; have $T_g$s in the desirable range of 85 to less than 130° C.; and/or have desirably high molecular weights of $M_w$ 170,000 g/mol or more (as measured versus polystyrene standards by GPC analysis).

Li et al. Macromolecules 2005, 38, 6767 discloses the synthesis of EDCPD copolymers containing 35.1-45 mole % DCPD and having $T_g$s of 101 to 125° C., using a scandium-based catalyst. These copolymers are described as amorphous and strictly alternating in structure, with an isotactic:syndiotactic ratio of incorporated DCPD units of about 40:60. The molecular weights of the copolymers (as measured by GPC versus polystyrene standards) range from $M_w$ 248,520-459,000 g/mol and $M_n$ 107,000-279,000 g/mol (with PDI 2.1-3.1). However, the synthesis of copolymers having $T_g$s in the remainder of the most desirable range for structural applications, i.e. from 85-100° C. and from 125-<130° C., is not disclosed. Furthermore, in addition to it being desirable to prepare EDCPD copolymers spanning a greater portion of the desirable $T_g$ range, for the cost considerations described above, it would be advantageous for EDCPD copolymers exhibiting $T_g$s in this desirable range to require a smaller amount of DCPD to achieve a particular $T_g$ [for example, it would be advantageous to prepare a copolymer exhibiting a $T_g$ of 101° C. that contained less than 35.1 mole % DCPD].

Given all of the foregoing considerations, it would be desirable to identify selected ethylene-DCPD copolymer materials, and preferred preparation procedures for making such materials. Such selection would provide copolymers of the ethylene-dicyclopentadiene type which have ideal thermal, rheological, and compositional characteristics to permit economic utilization of such materials to realize engineering thermoplastics. Such EDCPD materials are those which have sufficiently high molecular weights and the optimal and cost effective balance between DCPD content and appropriate $T_g$ values. These materials furthermore would be substantially free of any significant amounts of crystallizable contaminants such as polyethylene homopolymers.

It would also be desirable to provide hydrogenated or functionalized derivatives of such selected EDCPD copolymers which could be tailored to provide useful structural polyolefins.

Since hydrogenated EDCPD copolymers are derived from EDCPDs, the same trends and constraints previously discussed for EDCPD copolymer materials exist for hydrogenated EDCPDs (HEDCPDs). HEDCPDs having high contents of hydrogenated DCPD (HDCPD) units (40 to 46 mole % HDCPD) and high $T_g$s (140 to 170° C.) are disclosed in U.S. Pat. Nos. 6,191,243, 6,232,407, 6,388,032, and 6,476,153, European Patent Application Nos. EP1266937A1 and EP1028128A1, and Japanese Patent Applications JP2001329016A, JP2000119328A, and JP2002302518A1. These materials are synthesized by RuClH(CO)(PPh$_3$)$_3$- or Co(acac)$_3$-mediated hydrogenation of the EDCPD copolymers derived from trichloro(cyclopentadienyl)titanium, µ-(CH$_3$)$_2$C(cyclopentadienyl)(9-fluorenyl)ZrCl$_2$, and µ-(CH$_2$CH$_2$)bis(1-indenyl)ZrCl$_2$ polymerization catalysts. U.S. Pat. No. 6,191,243 also discloses the synthesis of a hydrogenated material containing 35 mole % HDCPD, but no $T_g$ or molecular weight information is given.

The art concerning HEDCPD copolymers with lower $T_g$s and/or mole % HDCPD contents indicates that such materials are of limited $T_g$ and molecular weight range. Naga et al. Polymer 2006, 47, 520-526 discloses the synthesis of HEDCPDs having 24.8-30.5 mole % HDCPD and $T_g$s of 74.8-83.3. The molecular weight of the copolymer having $T_g$ 83.3 is disclosed to be very low, $M_w$=6,200. Japanese Patent Application No. JP2001031716A discloses the preparation of HEDCPDs having 16, 27, or 40 mole % HDCPD and $T_g$s of, respectively, "below 100° C.", 83° C., and 133° C. These materials were derived from EDCPDs synthesized using a µ-(CH$_2$CH$_2$)bis(1-indenyl)ZrCl$_2$ catalyst and having GPC molecular weights ($M_w$) of 150,000 or less (versus polystyrene standards). Suzuki et al., J. Appl. Polym. Sci. 1999, 72, 103-108 teaches the synthesis of endo-HEDCPD copolymers derived from endo-EDCPDs prepared with a variety of zirconocenes. These materials have very low (4.4 mole % or less) HDCPD contents; no $T_g$s are reported.

In summary, it would be desirable to prepare HEDCPD copolymers that possess $T_g$s in the most useful range for structural applications, from 85 to less than 130° C. having high molecular weights ($M_w$ greater than or equal to 170,000 g/mol versus polystyrene standards as measured by GPC analysis) and also substantially free from crystalline material.

Functionalized EDCPD copolymers can also be usefully employed in the preparation of structural polyolefins. One of the most common types of functionalization of these materials containing co-monomers with unsaturation comprises materials prepared by epoxidation of the double bond within such unsaturated co-monomers. Epoxidized EDCPD copolymers are also in general known in the art.

Japanese Patent Application No. JP2001031716A discloses the synthesis of epoxy-EDCPD copolymers having 16, 27, and 40 mole % epoxy-DCPD units and $T_g$s of, respectively, 56, 112, and 178° C. These materials are derived from EDCPDs synthesized using a µL-(CH$_2$CH$_2$)bis(1-indenyl) ZrCl$_2$ catalyst and having GPC molecular weights ($M_w$) of 150,000 or less (versus polystyrene standards).

Li et al. Macromolecules 2005, 38, 6767, discussed above, and Hou, Z., Yuki Gosei Kagaku Kyokaishi (J. Synth. Org. Chem., Jpn.) 2005, 63, 1124 disclose the perbenzoic acid epoxidation of an alternating EDCPD copolymer having 45.0 mole % DCPD and $M_w$ 459,000 (via GPC versus polystyrene). The $T_g$ of the epoxidized material is 193° C., a very high value which is disadvantageous for the reasons described in paragraph.

In summary, it would be desirable to prepare epoxy-EDCPD copolymers that possess $T_g$s in the most useful range for functionalized materials used for structural applications, from 85 to 180° C., having high molecular weights ($M_w$ of 170,000 g/mol or more versus polystyrene standards as measured by GPC analysis) and also being substantially free from crystalline material.

SUMMARY OF THE INVENTION

In one aspect, the present invention is directed to copolymer compositions comprising copolymers derived from ethylene and dicyclopentadiene (DCPD) comonomers. Such compositions: a) have a DCPD-derived comonomer unit content of from about 25 mole % to 45 mole %; b) have a Weight Average Molecular Weight, $M_w$, of greater than about 170,000 g/mol as measured versus polystyrene standards by Gel Permeation Chromatography analysis; c) comprise amorphous material; and d) have glass transition temperatures, $T_g$s, which range from about 85° C. to about 129° C.; and e) which have a relationship of $T_g$ to the mole % DCPD defined by the equation:

$$T_g(\text{in } °\text{C.}) \geq [(\text{mole \% } DCPD \times 3.142) - 4.67];$$

and f) comprise no significant amount of crystalline polyethylene homopolymer or crystallizable polyethylene segments within the ethylene-dicylopentadiene copolymers therein. Most preferably, such compositions are those which have been prepared by polymerizing the co-monomers to form the copolymer using a metallocene catlayst, preferably a Group 4 metallocene catalyst.

In another aspect, the present invention is directed to hydrogenated or functionalized derivatives of the ethylene-dicyclopentadiene copolymer compositions herein. Such functionalized derivative compositions include those which have been epoxidized.

The hydrogenated ethylene-dicyclopentadiene copolymer compositions herein: a) have a DCPD-derived co-monomer unit content of from about 25 mole % to about 45 mole %; b) have a Weight Average Molecular Weight, $M_w$, of greater than about 170,000 g/mol as measured versus polystyrene standards by Gel Permeation Chromatography analysis; c) comprise amorphous material and have a glass transition temperature, $T_g$, of from about 85° C. to about 129° C.; and d) have from about 70% to 100% of the double bonds in the ethylene-dicyclopentadiene copolymers hydrogenated. Such hydrogenated copolymer compositions also preferably comprise no significant amount of crystalline polyethylene homopolymer or crystallizable polyethylene segments within the ethylene-dicyclopentadiene copolymers therein.

The epoxidized ethylene-dicyclopentadiene copolymer compositions herein: a) have a DCPD-derived co-monomer unit content of from about 25 mole % to about 45 mole %; b) have a Weight Average Molecular Weight, $M_w$, of greater than about 170,000 g/mol as measured versus polystyrene standards by Gel Permeation Chromatography analysis; c) comprise amorphous material and have a glass transition temperature, $T_g$, of from about 85° C. to about 180° C.; and d) have from about 70% to 100% of the double bonds in the ethylene-dicyclopentadiene copolymers converted to oxirane rings via epoxidation.

In another aspect, the present invention is also directed to a process for preparing ethylene-dicyclopentadiene copolymer compositions having the characteristics hereinbefore described. Such a process comprises: a) contacting ethylene with a polymerization mixture which has a dicyclopentadiene comonomer molar concentration of 4.0 molar or greater; with a preferably activated, selected specific type of metallocene catalyst under polymerization conditions including a temperature of from about 25° C to about 110° C. and an ethylene pressure of from about 14.7 psig to 700 psig (101.4 kPa to 4826.3 kPa) for a period of time sufficient to form the ethylene-dicyclopentadiene copolymer within the polymerization mixture. The resulting ethylene-dicyclopentadiene copolymer material can then be recovered from, or further reacted within, the polymerization mixture.

The type of metallocene catalyst preferably used in the preparation process is one represented the formula:

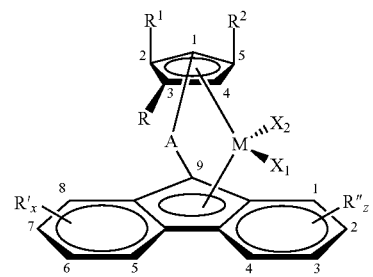

wherein M is a Group 3, 4, 5 or 6 transition metal atom, a lanthanide metal atom, or an actinide metal atom, A is bridging group, and $X_1$ and $X_2$ are ligands associated with the metal M. In particular, R is a group other than hydrogen, preferably a $C_1$-$C_4$ alkyl and most preferably methyl, at the 3-position on the cyclopentadienyl ring. $R^1$ and $R^2$ are each independently hydrogen or a hydrocarbyl group or a substituted hydrocarbyl groups, and each R' and each R'' is independently hydrogen or a hydrocarbyl group or a substituted hydrocarbyl group, where x and z are 0, 1, 2, 3, or 4 and indicate the degree of substitution on the six-membered ring. In an alternate embodiment, the cyclopentadienyl ring in the formula above is substituted at the 3-position with a $C_1$-$C_4$ alkyl and is also substituted at the 2- and/or 5-positions with a $C_1$-$C_{10}$ alkyl.

In yet another aspect, the present invention is directed to processes for preparing the hydrogenated and functionalized derivatives of the ethylene-DCPD copolymer compositions as hereinbefore described. Such functionalization can occur, for example, by epoxidation of the double bond in some or all of the cyclic DCPD-derived co-monomer units in the copolymer structure.

DETAILED DESCRIPTION OF THE INVENTION

The basic copolymers of the present invention are polyolefins comprising monomeric units derived from both ethylene and the diene dicyclopentadiene. In forming such copolymers, DCPD is selectively polymerized through enchainment of the norbornene ring in very general terms according to the following reaction Scheme 1:

Scheme 1. Synthesis of copolymer consisting of ethylene and dicyclopentadiene using a metallocene catylast.

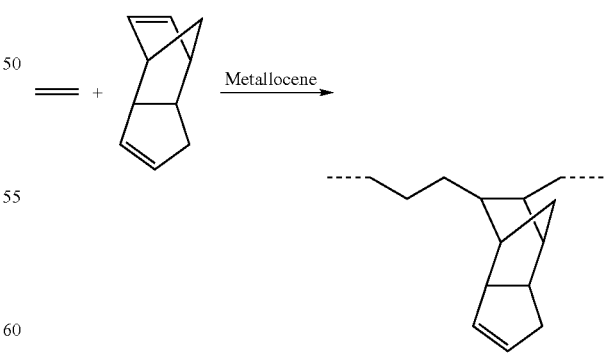

Copolymer Composition and Characteristics

The two comonomers ethylene and dicyclopentadiene are readily available raw materials. Ethylene is produced in the petrochemical industry via steam cracking or catalytic cracking of hydrocarbons. Ethylene can also be produced via catalytic conversion of oxygenate feedstocks using molecular sieve catalysts. Dicyclopentadiene, $C_{10}H_{12}$, is a hydrocarbon found in oil deposits. It is a clear and colorless liquid at room temperature. Dicyclopentadiene is coproduced in large quantities in the steam cracking of naphtha and gas oils to ethylene.

The copolymers in the ethylene-dicyclopentadiene compositions of the present invention will generally contain from about 25 mole % to about 45 mole % of the DCPD-derived monomeric units. More preferably, these copolymers herein will comprise from about 26 mole % to about 43 mole % of the DCPD-derived units. Most preferably, the DCPD content of these copolymers herein will range from about 27 mole % to about 42 mole %.

The copolymer compositions of the present invention will generally have a weight average molecular weight, $M_w$, of greater than about 170,000 g/mol as measured versus polystyrene standards by Gel Permeation Chromatography analysis. More preferably, the copolymer compositions herein will have an $M_w$ of greater than about 175,000, even more preferably greater than about 180,000, most preferably greater than about 200,000 g/mol. There is no theoretical upper limit to copolymer molecular weight but as a practical matter such materials will be no greater than about 1,000,000 or even 900,000 g/mol. As noted, weight average molecular weight for these copolymer materials can be determined using Gel Permeation Chromatography.

The ethylene-DCPD copolymer compositions of the present invention comprise amorphous materials. As used herein, an amorphous polymer is defined to be a polymeric material having no crystalline component, as evidenced by no discernible melting temperature ($T_m$) in its second heat Differential Scanning Calorimetry (DSC) spectrum, or a polymeric material having a crystalline component that exhibits a second heat DSC $T_m$ with a heat of fusion ($\Delta H_f$) of less than 0.50 J/g.

The amorphous copolymers herein are materials which must have glass transition temperature ($T_g$) characteristics as hereinbefore set forth. A simplistic view of the glass transition temperature of a polymeric material is the temperature below which molecules therein have very little mobility. On a larger scale, polymers are rigid and brittle below their glass transition temperature and can undergo plastic deformation above it. $T_g$ is usually applicable to amorphous phases such as the copolymers of the compositions of the present invention.

The glass transition temperature of the copolymers produced herein is measured according the DSC procedure described hereinafter in the Test Methods section.

The ethylene-dicyclopentadiene copolymer compositions herein will generally exhibit a glass transition temperature, $T_g$, of from about 85° C. to 129° C. At such $T_g$ values, these materials can suitably be used as engineering thermoplastics. More preferably the $T_g$ of the copolymer compositions herein will range from about 87° C. to about 129° C., most preferably from about 88° C. to about 128.5° C.

The EDCPD copolymer compositions herein will also have relatively low $T_g$ values for a given DCPD content. The $T_g$ value for the EDCPD compositions herein will generally conform to the following equation:

$T_g$ (in ° C.)≧[(mole % DCPD×3.142)−4.67]. In a preferred embodiment, the $T_g$ value for the EDCPD compositions herein will generally conform to the following equation: $T_g$ (in ° C.)≧[(mole % DCPD×3.142)−4.17].

The introduction of cyclic olefins, and in particular, fused ring cyclic olefins, into polymers with a saturated polyolefin backbone tends to increase the glass transition temperature, $T_g$, of the polymer. These changes arise from the introduction of catenated chains of the carbon atoms pendant on the saturated polyolefin backbone. In general, for the effect on the $T_g$, the introduction of equal mole fractions of alpha olefins and cyclic olefins of approximately equal number of carbon atoms increases with the degree of cyclic structures introduced into the polymer. The $T_g$ of the ethylene-DCPD copolymers of the present invention is typically dependent upon the amount of DCPD-derived units in the copolymer, with higher DCPD contents generally resulting in higher $T_g$ values for the copolymer.

Another feature of the ethylene-DCPD copolymer compositions herein relates to the need to eliminate from such compositions any significant amount of ethylene-DCPD copolymer material which has long, crystallizable polyethylene segments in the polymer chain. Likewise, it is also preferred that the copolymer compositions herein contain no significant amount of polyethylene homopolymers. The presence or absence of significant amounts of both types of these undesirable materials can be determined by using standard Differential Scanning Calorimetry (DSC) techniques (as described hereinafter in the Test Methods section) in testing the compositions herein for their thermal transition temperatures. For purposes of this invention, the absence of significant amounts of long, crystallizable polyethylene polymer segments and polyethylene homopolymers is determined to be when the copolymer compositions exhibit no detectable crystalline melting point ($T_m$) during the second heat of DSC analysis testing, or have a crystalline component that exhibits a second heat DSC $T_m$ with a heat of fusion ($\Delta H_f$) of less than 0.50 J/g. Such copolymers typically will also have CRYSTAF solubility readings of 90% or greater, more preferably of 92% or greater, most preferably of 94% or greater.

Process for Producing the EDCPD Copolymers Herein

The ethylene-DCPD copolymers of this invention can be produced via a polymerization reaction which takes place by contacting ethylene with a polymerization mixture containing the DCPD comonomer. The polymerization reaction is promoted by a selected catalyst or catalyst system and takes place under a selected set of polymerization reaction conditions.

The polymerization mixture will comprise at least about a 4.0 molar initial concentration of the requisite DCPD co-monomer. More preferably, the polymerization mixture will contain the DCPD co-monomer at an initial concentration of at least 4.5 molar, most preferably of at least 5.0 molar. Frequently, a diluent or solvent will make up the balance of the polymerization mixture. Aliphatic and aromatic hydrocarbons such as hexane, pentane, isopentane, cyclohexane, octane, toluene, xylene, and the like may be suitably used as a diluent or solvent for the polymerization mixture. The polymerization mixture will generally be in liquid or mixed liquid/solid form during the polymerization reaction carried out therein.

Any conventional type of polymerization process may be used to produce the ethylene-DCPD copolymers of this invention. Polymerization methods include high pressure, slurry, bulk, suspension, supercritical, or solution phase, or a combination thereof. Preferably solution phase or bulk phase polymerization processes are used.

Polymerization is generally carried out using a selected single-site metallocene catalyst or catalyst system of the type hereinafter described. The catalysts can be in the form of a homogeneous solution, supported, or a combination thereof. Polymerization may be carried out by a continuous, semi-continuous or batch process and may include use of chain transfer agents, scavengers, or other such additives as deemed applicable. By continuous is meant a system that operates (or is intended to operate) without interruption or cessation. For example a continuous process to produce a polymer would be one where the reactants are continually introduced into one or more reactors and polymer product is continually withdrawn.

A wide variety of transition metal compounds, e.g., metallocenes, are known which, when activated with a suitable activator, will polymerize olefinic monomers selectively to produce either crystalline polymers or amorphous polymers or copolymers. A full discussion of such compounds can be found in PCT Patent Publication No. WO 2004/046214, Published Jun. 3, 2004, the entire contents of which are incorporated herein by reference.

The catalysts for use in the production of the ethylene-DCPD copolymers of this invention are bridged metallocene materials which, upon activation, will selectively polymerize the specified types of comonomers herein to produce generally amorphous copolymers having the desired DCPD contents, $T_g$ values, and molecular weights. Such selected metallocene catalysts are of the general type represented by the bridged, substituted cyclopentadienyl-fluorenyl transition metal compounds conforming to the following Formula (1):

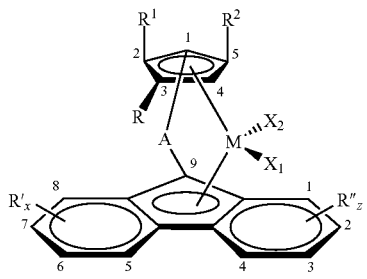

wherein
M is a Group 3, 4, 5 or 6 transition metal atom, a lanthanide metal atom, or an actinide metal atom, preferably a Group 4 transition metal atom, and most preferably zirconium;
R is not hydrogen and is a $C_1$ to $C_4$ alkyl group, preferably methyl, ethyl, n-propyl, isopropyl, butyl, n-butyl, t-butyl, or isobutyl, preferably methyl;
$R^1$, $R^2$, and each R' and R" is, independently, hydrogen, a hydrocarbyl group, or a substituted hydrocarbyl group, preferably a $C_1$ to $C_{20}$ hydrocarbyl group or a $C_1$ to $C_{20}$ substituted hydrocarbyl group;
"x" is 0, 1, 2, 3 or 4 and indicates the degree of substitution;
"z" is 0, 1, 2, 3 or 4 and indicates the degree of substitution; and
A is a bridging group preferably selected from the group consisting of R'$_2$C, R'$_2$Si, R'$_2$Ge, R'$_2$CCR'$_2$, R'$_2$CCR'$_2$CR'$_2$, R'$_2$CCR'$_2$CR'$_2$, R'C=CR', R'C=CR'R'$_2$, R'$_2$CCR'=CR'R'$_2$, R'C=CR'R'=CR', R'C=CR'R'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'N, R'P, O, S, Se, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$-$C_{20}$-containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent, preferred examples for the bridging group A include $CH_2$, $CH_2CH_2$, $C(CH_3)_2$, O, S, $SiMe_2$, $SiPh_2$, $SiMePh$, Si(para-trimethylsilylphenyl)$_2$, and Si(para-triethylsilylphenyl)$_2$, where Me is methyl and ph is phenyl; and $X_1$ and $X_2$ are ligands associated with the M metal, preferably $X_1$ and $X_2$ are, independently, halogen radicals, hydride radicals, hydrocarbyl radicals, substituted hydrocarbyl radicals, halocarbyl radicals, substituted halocarbyl radicals, and hydrocarbyl- and halocarbyl-substituted organometalloid radicals, or $X_1$ and $X_2$ are joined and bound to the metal atom to form a metallacycle ring containing from about 3 to about 20 carbon atoms; with the proviso that $X_1$ and $X_2$ are preferably not a substituted or unsubstituted cyclopentadienyl ring. Preferred $X_1$ and $X_2$ ligands include chlorine, bromine, methyl, ethyl, butyl, t-butyl and the like.

The selected metallocene catalysts used in the process of this invention are those wherein R in the above Formula (1) is a non-hydrogen substituent on the 3-carbon atom of the cyclopentadienyl ring. Preferably R is $C_1$ to $C_4$ alkyl such as methyl, ethyl, propyl, isopropyl, n-butyl or tert-butyl. Most preferably, R is methyl. Accordingly, illustrative, but not limiting examples of preferred asymmetrical cyclopentadienyl metallocenes of the type described in Formula (1) above for the invention are:

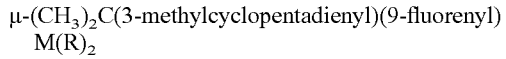
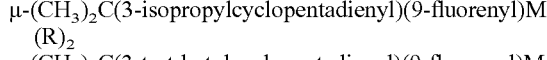
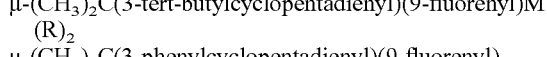
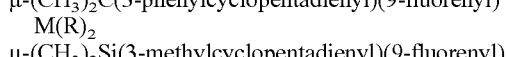
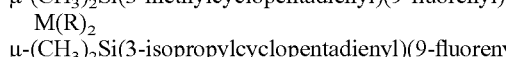
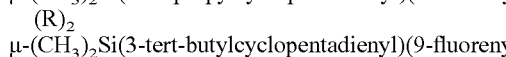
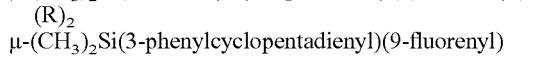
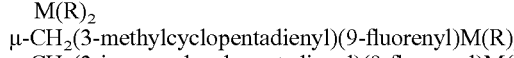
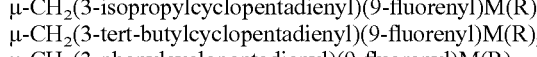
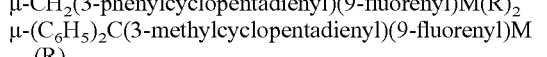
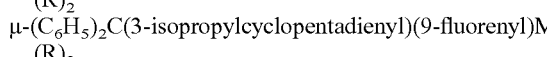
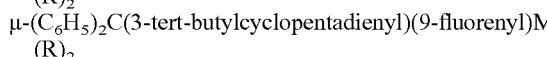
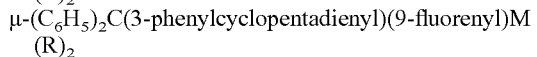
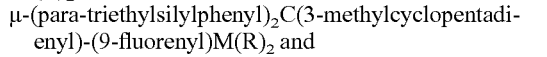
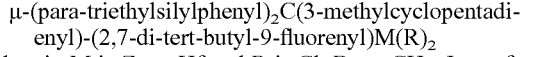
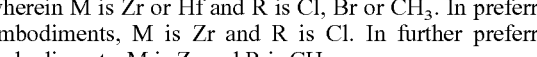
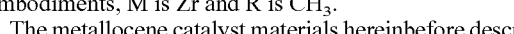

wherein M is Zr or Hf and R is Cl, Br or $CH_3$. In preferred embodiments, M is Zr and R is Cl. In further preferred embodiments, M is Zr and R is $CH_3$.

The metallocene catalyst materials hereinbefore described are typically activated in various ways to yield compounds having a vacant coordination site that will coordinate, insert, and polymerize olefin(s). For the purposes of this patent specification and appended claims, the terms "cocatalyst"

and "activator" are used herein interchangeably and are defined to be any compound which can activate any one of the catalyst compounds described hereinbefore by converting the catalyst compound to a catalytically active catalyst compound cation. Non-limiting activators, for example, include aluminoxanes (also called alumoxanes), aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound metal ligand making the metal complex cationic and providing a charge-balancing noncoordinating or weakly coordinating anion.

Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B-0 279 586, EP-A-0 594-218 and EP-B1-0 586 665, and PCT Publication Nos. WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, and disclosed in U.S. Pat. No. 5,041,584).

In addition or in place of alumoxanes, the metallocene catalyst compounds described herein can be activated using an ionizing or stoichiometric activator, neutral or ionic, such as tri(n-butyl)ammonium tetrakis(perfluorophenyl)borate, a tris(perfluorophenyl)boron metalloid precursor or a tris(perfluoronaphthyl)boron metalloid precursor, polyhalogenated heteroborane anions (WO 98/43983), boric acid (U.S. Pat. No. 5,942,459) or a combination thereof.

Examples of neutral stoichiometric activators include trisubstituted boron, tellurium, aluminum, gallium and indium complexes or mixtures thereof. The three substituent groups of said activators are each independently selected from alkyls, alkenyls, substituted alkyls, aryls, arylhalides, alkoxides and halides. Preferably, the three groups are independently selected from halides, mono- or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is tris(perfluorophenyl)boron or tris (perfluoronaphthyl)boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference. Ionic catalysts can be prepared by reacting a transition metal compound with a neutral Lewis acid, such as $B(C_6F_6)_3$, which upon reaction with the hydrolyzable ligand (X) of the transition metal compound forms an anion, such as ([B $(C_6F_5)_3$ (X)]$^-$), which stabilizes the cationic transition metal species generated by the reaction Compounds useful as an activator component in the preparation of the ionic catalyst systems used in the process of this invention comprise a cation, which is preferably a Bronsted acid capable of donating a proton, and a compatible non-coordinating anion that is relatively large (bulky) and capable of stabilizing the active catalyst species (the Group 4 cation) which is formed when the two compounds are combined and said anion will be sufficiently labile to be displaced by olefinic, diolefinic, and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

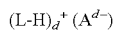

wherein
L is an neutral Lewis base;
H is hydrogen;
$(L-H)^+$ is a Bronsted acid;
$A^{d-}$ is a non-coordinating anion having the charge d-; and
d is an integer from 1 to 3.

The cation component $(L-H)_d^+$ may include Bronsted acids such as protons or protonated Lewis bases or reducible Lewis acids capable of protonating or abstracting a moiety, such as an alkyl or aryl, from the bulky transition metal (metallocene) catalyst precursor, resulting in a cationic transition metal species.

The anion component $A^{d-}$ includes those having the formula $[M^{k+}Q_n]^{d-}$ wherein k is an integer from 1 to 3; n is an integer from 2-6; n-k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a perfluoroaryl group. Examples of suitable $A^{d-}$ also include diboron compounds as disclosed in U.S. Pat. No. 5,447,895, which is fully incorporated herein by reference.

Illustrative, but not limiting examples of the ionic stoichiometric activator $(L-H)_d^+ (A^{d-})$ are N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, and tri(n-butyl)ammonium tetrakis(perfluorophenyl)borate.

In one embodiment, activation methods using ionizing ionic compounds not containing an active proton but capable of producing a bulky ligand metallocene catalyst cation and its non-coordinating anion are also contemplated, and are described in EP-A-0 426 637, EP-A-0 573 403 and U.S. Pat. No. 5,387,568, which are all herein incorporated by reference. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an olefinically, diolefinically, or acetylenically unsaturated monomer during polymerization. These types of cocatalysts sometimes use triisobutyl aluminum or trioctyl aluminum as a scavenger.

The polymerization process also can employ cocatalyst compounds or activator compounds that are initially neutral Lewis acids but form a cationic metal complex and a noncoordinating anion, or a zwitterionic complex, upon reaction with the catalysts (or catalyst precursors) used for polymerization. For example, tris(perfluorophenyl)boron or tris(perfluorophenyl)aluminum act to abstract a hydrocarbyl or hydride ligand to yield a cationic metal complex and stabilizing noncoordinating anion, see EP-A-0 427 697 and EP-A-0 520 732 for illustrations of analogous Group 4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

The catalyst systems used to produce the ethylene-DCPD copolymers herein may also include a support material or carrier. For example, the one or more catalyst components and/or one or more activators may be deposited on, contacted with, vaporized with, bonded to, or incorporated within, adsorbed or absorbed in, or on, one or more supports or carriers. The support material can be any of the conventional support materials. Preferably the support material is a porous support material, for example, talc, inorganic oxides, or inorganic chlorides. Other support materials include resinous support materials such as polystyrene, functionalized or crosslinked organic supports, such as poly(styrene-co-divinylbenzene)polyolefins or polymeric compounds, zeolites, clays, or any other organic or inorganic support material and the like, or mixtures thereof.

The preferred support materials are inorganic oxides that include Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is preferred that the support material, most preferably an inorganic oxide, has a surface area in the range of from about 10 to about 700 $m^2/g$, a pore volume in the range of from about 0.1 to about 4.0 cc/g, and an average particle size in the range of from about 5 to about 500 μm. More preferably, the surface area of the support material is in the range of from about 50 to about 500 $m^2/g$, the pore volume is in the range of from about 0.5 to about 3.5 cc/g, and the average particle size is in the range of from about 10 to about 200 μm. Most preferably, the surface area of the support material is in the range of from about 100 to about 400 $m^2/g$, the pore volume is in the range of from about 0.8 to about 3.0 cc/g, and the average particle size is in the range of from about 5 to about 100 μm. The average pore size of the carrier useful for the catalysts used herein typically has a pore size in the range of from about 10 to about 100 Å, preferably about 50 to about 500 Å, and most preferably about 75 to about 350 Å.

As is well known in the art, the two or more catalysts and/or activators may also be supported together on one inert support, or the catalysts may be independently placed on two inert supports and subsequently mixed. Of the two methods, the former is preferred.

Homogeneous solution polymerization generally involves polymerization in a continuous or batch reactor in which the copolymer is formed and the starting monomer and catalyst materials are supplied, and are agitated to reduce or avoid concentration gradients. The polymerization process herein can be conducted by maintaining the polymerization mixture at temperature ranging from about 25° C. to about 110° C., more preferably from about 30° C. to about 100° C., and most preferably from about 70° C. to about 90° C.

Temperature control in the reactor can be maintained by balancing the heat of polymerization, with reactor heating or cooling carried out by reactor jackets, external heat exchangers, or internal heating or cooling coils to heat or cool the contents of the reactor as needed, by using pre-heated or pre-chilled feeds, by vaporization of a liquid medium (diluent, monomers or solvent), or by combinations of all three. Adiabatic reactors with pre-heated or pre-chilled feeds may also be used.

The polymerization reaction is carried out by maintaining the polymerization mixture in contact with ethylene at suitable reaction pressures. Ethylene pressure, in fact, may play a role in realizing ethylene-DCPD copolymers herein of especially desirable, relatively low $T_g$ values. Accordingly, in the polymerization process herein, ethylene pressure should vary between about 14.7 psig (101.4 kPa) and about 700 psig (4826.3 kPa), more preferably between about 50 psig (344.7 kPa) and about 600 psig (4136.9 kPa), most preferably between about 100 psig (689.5 kPa) and about 500 psig (3447.4 kPa).

With respect to apparatus employed in conducting the polymerization process herein, the process can be carried out in a continuous stirred tank reactor, a batch reactor or a plug flow reactor, or more than one reactor operated in series or parallel. These reactors may have or may not have internal cooling or heating, and the monomer feed may or may not be heated or refrigerated.

The copolymers formed within the polymerization mixture may be recovered therefrom by any suitable conventional separation means. For example, the formed copolymer material can be precipitated from the polymerization reaction mixture using a suitable agent such as methanol and thereafter recovered via filtration. The recovered material can then be further washed, re-precipitated, re-filtered and dried to provide the desired copolymers in usable form.

The copolymers formed within the polymerization mixture may also not be recovered therefrom as is but may instead be further reacted within the polymerization mixture to form other desired materials. For example, the ethylene-DCPD copolymers formed within the polymerization mixture may be hydrogenated in situ or functionalized in situ by means of epoxidation of the double bond in the DCPD monomer units in a manner hereinafter described in greater detail. The resulting hydrogenated or functionalized copolymers can then be recovered from the polymerization/functionalization reaction mixture in conventional fashion.

Hydrogenation and Functionalization of Ethylene-DCPD Copolymers

The ethylene-DCPD copolymers of the present invention comprise a polymeric backbone which contains pendant polycyclic moieties as shown in the copolymerization reaction scheme set forth above. These pendant polycyclic moieties contain one double bond, and that double bond renders the resulting ethylene-DCPD copolymers relatively unstable. For example, unsaturation in the EDCPD copolymers renders these materials susceptible to cross-linking, oxidation and other unwanted side reactions during processing and use.

The presence of the double bonds in the pendant polycyclic moieties, however, also provides the EDCPD copolymers herein with a reactive "hook" by and through which these EDCPD copolymers can be readily derivatized, hydrogenated, or functionalized. Such derivatization, hydrogenation, or functionalization can occur by means of subjecting the ethylene-DCPD copolymers herein to a hydrogenation or epoxidation reaction. Hydrogenation results in the pendant polycyclic olefin-containing units of the EDCPD copolymer being converted into saturated aliphatic polycyclic units. Such hydrogenated copolymers are relatively more stable than the unsaturated EDCPD copolymers and have properties which make them especially suitable as engineering thermoplastics or precursors thereof. Functionalization by epoxidation results in the addition of epoxide groups to the copolymer's pendant polycyclic moieties at the site of, and replacing, the double bond therein. Such epoxidized copolymers have enhanced polarity, miscibility, and filler interaction properties which make them especially suitable as structural engineering thermoplastics or precursors thereof, despite the general increase of $T_g$ which is observed upon epoxidation due to the increased rigidity of the DCPD-derived co-monomer units. These materials therefore present additional options for achieving optimum price versus performance balance in structural applications.

One suitable procedure for derivatizing the ethylene-DCPD copolymer compositions herein comprises the complete or partial hydrogenation of such materials. Hydrogenation can be carried out by contacting the ethylene-DCPD copolymer compositions herein, in a suitable reaction mixture, with hydrogen in the presence of a suitable hydrogenation catalyst and under appropriate hydrogenation reaction conditions.

The reaction mixture for copolymer hydrogenation can be generally formed by dissolving the EDCPD copolymer composition in an appropriate solvent such as substituted or unsubstituted aliphatic or aromatic hydrocarbons (e.g., cyclohexane, toluene, xylenes, tetrachloroethane, or dichlorobenzene). As noted, hydrogenation can be carried out using the same polymerization mixture wherein the EDCPD copolymer compositions have been formed.

Any conventional hydrogenation catalyst or reagent may be employed in the hydrogenation procedure. Such catalysts can include, for example, $RuClH(CO)(PPh_3)_3$, $Co(acac)_3/Bu_3Al$, nickel silica alumina, nickel/tungsten sulfides, Co-octanoate/$Et_3Al$, platinum/palladium, Pd/C, $Rh(PPh_3)_3Cl$, and the like (where Ph is phenyl, acac is acetyl acetonoate, Bu is butyl, and Et is ethyl). Such hydrogenation catalysts may be homogenous or heterogeneous (e.g., supported on silicates or aluminum oxides) in form. Suitable hydrogenation catalysts, catalyst systems, and catalyst supports are described in greater detail in U.S. Pat. Nos. 6,191,243 and 6,476,153, both of which are incorporated herein by reference. Such stoichiometric hydrogenation reagents can include, for example, para-toluenesulfonhydrazide, as described in Naga et al. Polymer 2006, 47, 520-526, herein incorporated by reference.

Hydrogenation conditions also include conventional hydrogenation reaction temperatures and hydrogen pressures. Hydrogenation temperatures can range, for example, from about 45° C. to about 180° C., more preferably from about 80° C. to about 140° C. Hydrogen pressures of from about 200 psig (1379.0 kPa) to about 1600 psig (11,031.6 kPa), more preferably from about 600 psig (4136.9 kPa) to about 1000 psig (6894.8 kPa), may be employed. Hydrogenation levels can be complete (100%) or partial (e.g., at least 0.1% or from about 0.1% to about 99.9%, alternately greater than 80%, alternately greater than 90%).

The resulting hydrogenated EDCPD copolymer compositions (i.e., HEDCPD materials) can be recovered from the reaction mixture using any conventional recovery or separation techniques (e.g., precipitation/filtration). Such HEDCPD copolymers retain many of the beneficial thermal, rheological and mechanical properties of the precursor EDCPD copolymers but are more stable and less susceptible to degradation.

The hydrogenated ethylene-dicyclopentadiene copolymer compositions herein can generally have a DCPD-derived co-monomer unit content of from about 25 mole % to about 45 mole %. More preferably, the DCPD-derived co-monomer content of the hydrogenated EDCPD copolymer compositions herein will range from about 26 mole % to about 43 mole %, most preferably from about 27 mole % to about 42 mole %.

The hydrogenated ethylene-dicyclopentadiene copolymer compositions herein can also generally have a Weight Average Molecular Weight, $M_w$, of greater than about 170,000 g/mol as measured versus polystyrene standards by GPC analysis. More preferably, the $M_w$ of the hydrogenated copolymer compositions herein will be greater than about 175,000, even more preferably greater than about 180,000, most preferably greater than about 200,000 g/mol.

Further, the hydrogenated ethylene-dicyclopentadiene copolymer compositions herein can also generally have a glass transition temperature, $T_g$, of from about 85° C. to about 129° C., more preferably from about 87° C. to about 129° C., most preferably from about 88° C. to about 128.5° C. These hydrogenated compositions can also have from about 70% to 100% of the double bonds in the ethylene-dicyclopentadiene copolymers hydrogenated. More preferably, from about 95% to about 100% of the double bonds in the copolymer can be hydrogenated, as measured by proton NMR as described in the TEST METHODS below.

As with the unsaturated ethylene-dicyclopentadiene copolymer compositions from which they can be derived, the hydrogenated EDCPD copolymer compositions herein will preferably contain no significant amount of crystalline polyethylene homopolymer or crystallizable polyethylene segments within the hydrogenated ethylene-dicyclopentadiene copolymers. Again, this is determined to be when the hydrogenated copolymer compositions exhibit no detectable crystalline melting point ($T_m$) during the second heat of DSC analysis testing, or have a crystalline component that exhibits a second heat DSC $T_m$ with a heat of fusion ($\Delta H_f$) of less than 0.50 J/g. Typically such hydrogenated copolymers will have CRYSTAF solubility readings of 90% or greater, more preferably of 92% or greater, most preferably of 94% or greater.

Another suitable procedure for derivatizing the ethylene-DCPD copolymers herein comprises functionalization by epoxidation of such materials. Epoxidation can be carried out with very high conversions of the double bonds of the DCPD-derived monomeric unit to oxirane groups. Epoxidation can be carried out by contacting the ethylene-DCPD copolymers herein, in a suitable reaction mixture, with peroxides or peracids, generally without the use or presence of a catalyst and under appropriate epoxidation reaction conditions.

The reaction mixture for copolymer epoxidation can be generally formed by dissolving the EDCPD copolymers in an appropriate solvent such as substituted or unsubstituted aliphatic or aromatic hydrocarbons (e.g., toluene or chloroform). As noted, functionalization such as epoxidation can be carried out using the same polymerization mixture wherein the EDCPD copolymers have been formed.

To bring about epoxidation of the EDCPD copolymers herein, an appropriate epoxidizing agent is added to the reaction mixture containing the EDCPD copolymers. Peracids are the preferred epoxidizing agents. Peracids such a 3-chloroperbenzoic acid may be added as such or peracids may be formed in situ within the reaction mixture. A preferred method of peracid formation in situ involves the addition to the reaction mixture of a combination of both hydrogen peroxide and formic acid. Formic acid can be added in a molar ratio to the EDCPD double bonds of from about 10:1 to about 30:1. Hydrogen peroxide can be added to the reaction mixture in a molar ratio to the EDCPD double bonds of from about 1.01:1 to about 5:1. Addition of both formic acid and $H_2O_2$ to the reaction mixture results in the in situ formation of performic acid as an epoxidizing agent.

Epoxidation conditions also include conventional reaction temperatures and reaction times, generally at ambient pressure. Epoxidation temperatures can range, for example, from about 0° C. to about 75° C., more preferably from about 20° C. to about 60° C. Reaction time for the epoxidation reaction can range from about 1 hour to about 36 hours, more preferably from about 2 hours to about 28 hours. Epoxidation levels can generally range from about 0.1% to about 100% of the double bonds in the EDCPD copolymer. Minor amounts of byproducts such as formate hemiesters or diols (from ring opening) can form during epoxidation. Such materials can be formed at levels of below about 5 mole %, and at these levels they do not imbue undesirable results.

The resulting epoxidized EDCPD copolymers can be recovered from the reaction mixture using any conventional recovery or separation techniques (e.g., precipitation/filtration). Such epoxidized EDCPD copolymers retain many of the beneficial thermal, rheological and mechanical properties of the precursor EDCPD copolymers. Epoxidation generally increases the glass transition temperature, $T_g$, of the copolymer and imbues polarity, which provides a different balance between properties, cost, and processing range, and makes the resulting materials especially useful as structural engineering thermoplastics or precursors thereof.

The epoxidized ethylene-dicyclopentadiene copolymer compositions herein can generally have a DCPD-derived co-monomer unit content of from about 25 mole % to about 45 mole %. More preferably, the DCPD-derived co-monomer content of the epoxidized EDCPD copolymer compositions herein will range from about 26 mole % to about 43 mole %, most preferably from about 27 mole % to about 42 mole %.

The epoxidized ethylene-dicyclopentadiene copolymer compositions herein can also generally have a Weight Average Molecular Weight, $M_w$, of greater than about 170,000 g/mol as measured versus polystyrene standards by GPC analysis. More preferably, the $M_w$ of the epoxidized copolymer compositions herein will be greater than about 175,000 g/mol, even more preferably greater than about 180,000 g/mol, most preferably greater than about 200,000 g/mol.

Further, the epoxidized ethylene-dicyclopentadiene copolymer compositions herein can also generally have a glass transition temperature, $T_g$, of from about 85° C. to about 180° C., more preferably from about 100° C. to about 175° C., even more preferably from about 110° C. to about 170° C., most preferably from about 113° C. to about 167° C. These epoxidized compositions can also have from about 50% to 100% of the double bonds in the ethylene-dicyclopentadiene copolymers converted into oxirane rings via epoxidation. More preferably, from about 95% to about 100% of the double bonds in the copolymer can be converted into oxirane rings.

As with the unsaturated ethylene-dicyclopentadiene copolymer compositions from which they can be derived, the epoxidized EDCPD copolymer compositions herein will preferably contain no significant amount of crystalline polyethylene homopolymer or crystallizable polyethylene segments within the epoxidized ethylene-dicyclopentadiene copolymers. Again, this is determined when the epoxidized copolymer compositions exhibit no detectable crystalline melting point ($T_m$) during the second heat of DSC analysis testing, or have a crystalline component that exhibits a second heat DSC $T_m$ with a heat of fusion ($\Delta H_f$) of less than 0.50 J/g. Such epoxidized copolymers typically will also have CRYSTAF solubility readings of 90% or greater, more preferably of 92% or greater, most preferably of 94% or greater.

Applications

In some embodiments, the copolymers produced herein may be blended with other polymers (such as polyethylene (homo- or copolymers), polypropylene (homo- or copolymers), polyamides, ethylene/vinyl acetate copolymers, impact copolymers, and the like). The copolymer produced here may be present in such blends at 1 to 99 wt %, preferably 10 to 90 wt %, more preferably 25 to 75 wt %, based upon the weight of the composition. Likewise, the other polymer may be present in the blend at 99 to 1 wt %, preferably 90 to 10 wt %, more preferably 75 to 25 wt %, based upon the weight of the composition.

The copolymers poduced herein and/or blends thereof may be processed by any suitable means such as by calendering, casting, coating, compounding, extrusion, foamed, laminated, blow molding, compression molding, injection molding, thermoforming, transfer molding, cast molding, rotational molding, casting such as for films, spun or melt bonded such as for fibers, or other forms of processing such as described in, for example, Plastics Processing (Radian Corporation, Noyes Data Corp. 1986). More particularly, with respect to the physical process of producing the blend, sufficient mixing should take place to assure that a uniform blend will be produced prior to conversion into a finished product.

The copolymers of this invention (and blends thereof as described above) may be used in any known structural polyolefin application, particuay those involving molding or extrusion. Examples include uses in films, tapes, sheets, tubing, hose, sheeting, wire and cable coating, bumpers, gaskets, and molded parts. These articles and/or devices may be made or formed by any useful forming means for forming polyolefins. This will include, at least, molding including compression molding, injection molding, blow molding, and transfer molding; film blowing or casting; extrusion, and thermoforming; as well as by lamination, pultrusion, protrusion, draw reduction, rotational molding or combinations thereof.

Non-limiting examples of desirable articles of manufacture made from compositions of the invention include films, sheets, tubes, pipes, automotive components, furniture, sporting equipment, food storage containers, transparent and semitransparent articles, toys, medical devices, cookware and storage ware, sterilizable medical devices, sterilization containers, articles useful in vehicles (such as cars, trucks, boats, all terrain vehicles, jet skis, golf carts, snowmobiles, motorcycles, and the like) including instrument panels; bumper fascias; structural components; interior trim, including steering column covers, consoles, door panels, pillars; exterior trim, including body side moldings, running boards; passenger side airbag covers; headliner; trays, cupholders, compartments, lids; seat components, including back, supports; load floors; electrical housings; underhood applications, including battery trays, fan shrouds; exterior body panels; wheel covers, liners; and splash shields.

The composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

In another embodiment, this invention relates to:
1. An ethylene-dicyclopentadiene copolymer composition comprising copolymers derived from ethylene and dicyclopentadiene (DCPD) co-monomers, wherein said copolymer composition:
    a) has a DCPD-derived comonomer unit content of from about 25 mole % to about 45 mole %;
    b) has a Weight Average Molecular Weight, $M_w$, of greater than about 170,000 g/mol;
    c) comprises amorphous material and has a glass transition temperature, $T_g$, which is from about 85° C. to about 129° C.; and which has a relationship to the mole % DCPD defined by the equation $T_g$ (in ° C.)$\geq$[(mole % DCPD$\times$3.142)−4.67]; and
    d) comprises no significant amount of crystalline polyethylene homopolymer or crystallizable polyethylene segments within said ethylene-dicylopentadiene copolymers.
2. A copolymer composition according to paragraph 1 which has a glass transition temperature, $T_g$, which is from about 87° C. to about 129° C.
3. A copolymer composition according to paragraph 1 or 2 which has a DCPD-derived comonomer unit content of from about 26 mole % to about 43 mole %.
4. A copolymer composition according to paragraph 1, 2 or 3 which has a glass transition temperature, $T_g$, which is from about 88° C. to about 128.5° C.
5. A copolymer composition according to any of paragraphs 1 to 4 which has a weight average molecular weight, $M_w$, of greater than about 175,000 g/mol.
6. A derivatized copolymer composition wherein an ethylene-dicyclopentadiene copolymer composition according to any of paragraphs 1 to 5 is derivatized by hydrogenation, and/or by epoxidation of the double bond in some or all of the cyclic co-monomers in said copolymer composition.
7. A hydrogenated ethylene-dicyclopentadiene copolymer composition comprising hydrogenated copolymers derived from ethylene and dicyclopentadiene (DCPD) co-monomers, wherein said hydrogenated copolymer composition:
    a) has a DCPD-derived comonomer unit content of from about 25 mole % to about 45 mole %;
    b) has a Weight Average Molecular Weight, $M_w$, of greater than about 170,000 g/mol;
    c) comprises amorphous material and has a glass transition temperature, $T_g$, of from about 85° C. to about 129° C.; and
    d) has from about 70% to 100% of the double bonds in the ethylene-dicyclopentadiene copolymers hydrogenated.
8. A hydrogenated ethylene-dicyclopentadiene copolymer composition according to paragraph 7 which comprises no significant amount of crystalline polyethylene homopolymer or crystallizable polyethylene segments within said hydrogenated ethylene-dicylopentadiene copolymers.
9. A hydrogenated ethylene-dicyclopentadiene copolymer composition according to paragraph 7 or 8 which has a glass transition temperature, $T_g$, of from about 87° C. to about 129° C.
10. A hydrogenated ethylene-dicyclopentadiene copolymer composition according to paragraph 7, 8, or 9 which has a DCPD-derived comonomer unit content of from about 26 mole % to about 43 mole %.
11. A hydrogenated ethylene-dicyclopentadiene copolymer composition according to paragraph 7, 8, 9, or 10 which has a glass transition temperature, $T_g$, of from about 88° C. to about 128.5° C.
12. A hydrogenated ethylene-dicyclopentadiene copolymer composition according to paragraph 7, 8, 9 10, or 11 which has a weight average molecular weight, $M_w$, of greater than about 175,000 g/mol.
13. An epoxidized ethylene-dicyclopentadiene copolymer composition comprising epoxidized copolymers derived from ethylene and dicyclopentadiene (DCPD) co-monomers, wherein said epoxidized copolymer composition:
    a) has a DCPD-derived comonomer unit content of from about 25 mole % to about 45 mole %;
    b) has a Weight Average Molecular Weight, $M_w$, of greater than about 170,000 g/mol;
    c) comprises amorphous material and has a glass transition temperature, $T_g$, of from about 85° C. to about 180° C.; and
    d) has from about 50% to 100% of the double bonds in the epoxidized ethylene-dicyclopentadiene copolymers converted to oxirane rings via epoxidation.
14. An epoxidized ethylene-dicyclopentadiene copolymer composition according to paragraph 13 which comprises no significant amount of crystalline polyethylene homopolymer or crystallizable polyethylene segments within said epoxidized ethylene-dicylopentadiene copolymers.

15. An epoxidized ethylene-dicyclopentadiene copolymer composition according to paragraph 13 or 14 which has a glass transition temperature, $T_g$, of from about 100° C. to about 175° C.

16. An epoxidized ethylene-dicyclopentadiene copolymer composition according to paragaph 13, 14, or 15 which has a DCPD-derived comonomer unit content of from about 26 mole % to about 43 mole %.

17. An epoxidized ethylene-dicyclopentadiene copolymer composition according to paragraph 13, 14, 15, or 16 which has a glass transition temperature, $T_g$, of from about 110° C. to about 170° C.

18. An epoxidized ethylene-dicyclopentadiene copolymer composition according to paragraph 13, 14, 15, 16, or 17 which has a weight average molecular weight, $M_w$, of greater than about 175,000 g/mol.

19. An epoxidized ethylene-dicyclopentadiene copolymer composition according to paragraph 13, 14, 15, 16, 17 or 18 which contains less than 5 mole % of DCPD units bearing formate hemiester and/or diol substituents.

20. A process for preparing an ethylene/dicyclopentadiene copolymer composition according to any of claims 1 to 19, which process comprises:
    a) contacting ethylene with a polymerization mixture comprising about 4.0 molar or greater of dicyclopentadiene comonomer, with an activated metallocene catalyst under polymerization conditions including a temperature of from about 25° C. to about 110° C. and an ethylene pressure of from about 101.4 kPa (14.7 psig) to about 4826.3 kPa (700 psig) for a period of time sufficient to form ethylene-dicyclopentadiene copolymers within said polymerization mixture; and
    b) recovering or further reacting said ethylene-dicyclopentadiene copolymers from or within said polymerization mixture;
wherein said metallocene catalyst is represented by the formula:

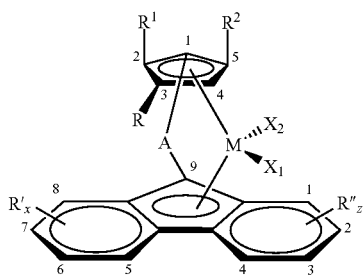

wherein
M is a Group 3, 4, 5 or 6 transition metal atom, a lanthanide metal atom, or an actinide metal atom;
R is not hydrogen and is a hydrocarbyl or substituted hydrocarbyl group;
$R^1$, $R^2$, and each R' and R'' is, independently, hydrogen, a hydrocarbyl group, or a substituted hydrocarbyl group;
"x" is 0, 1, 2, 3, or 4;
"z" is 0, 1, 2, 3, or 4;
A is a bridging group; and
$X_1$ and $X_2$ are ligands associated with the metal M.

21. A process according to paragraph 20 wherein said polymerization mixture comprises greater than about 4.5 molar concentration of dicyclopentadiene.

22. A process according to paragraph 20 or 21 wherein M is zirconium or hafnium.

23. A process according to paragraph 20, 21, or 22 wherein said R substituent is methyl, ethyl, propyl, isopropyl, n-butyl, isobutyl or tert-butyl.

24. A process according to paragraph 20, 21, 22, or 23 wherein said metallocene catalyst is activated by the presence of a co-catalyst activator.

25. A process according to paragraph 20, 21, 22, 23, or 24 wherein said metallocene catalyst is selected from the group consisting of:
    μ-$(CH_3)_2$C(3-methylcyclopentadienyl)(9-fluorenyl)M$(R)_2$
    μ-$(CH_3)_2$C(3-isopropylcyclopentadienyl)(9-fluorenyl)M$(R)_2$
    μ-$(CH_3)_2$C(3-tert-butylcyclopentadienyl)(9-fluorenyl)M$(R)_2$
    μ-$(CH_3)_2$C(3-phenylcyclopentadienyl)(9-fluorenyl)M$(R)_2$
    μ-$(CH_3)_2$Si(3-methylcyclopentadienyl)(9-fluorenyl)M$(R)_2$
    μ-$(CH_3)_2$Si(3-isopropylcyclopentadienyl)(9-fluorenyl)M$(R)_2$
    μ-$(CH_3)_2$Si(3-tert-butylcyclopentadienyl)(9-fluorenyl)M$(R)_2$
    μ-$(CH_3)_2$Si(3-phenylcyclopentadienyl)(9-fluorenyl)M$(R)_2$
    μ-$CH_2$(3-methylcyclopentadienyl)(9-fluorenyl)M$(R)_2$
    μ-$CH_2$(3-isopropylcyclopentadienyl)(9-fluorenyl)M$(R)_2$
    μ-$CH_2$(3-tert-butylcyclopentadienyl)(9-fluorenyl)M$(R)_2$
    μ-$CH_2$(3-phenylcyclopentadienyl)(9-fluorenyl)M$(R)_2$
    μ-$(C_6H_5)_2$C(3-methylcyclopentadienyl)(9-fluorenyl)M$(R)_2$
    μ-$(C_6H_5)_2$C(3-isopropylcyclopentadienyl)(9-fluorenyl)M$(R)_2$
    μ-$(C_6H_5)_2$C(3-tert-butylcyclopentadienyl)(9-fluorenyl)M$(R)_2$
    μ-$(C_6H_5)_2$C(3-phenylcyclopentadienyl)(9-fluorenyl)M$(R)_2$
    μ-(para-triethylsilylphenyl)$_2$C(3-methylcyclopentadienyl)-(9-fluorenyl)M$(R)_2$ and
    μ-(para-triethylsilylphenyl)$_2$C(3-methylcyclopentadienyl)-(2,7-di-tert-butyl-9-fluorenyl)M$(R)_2$
    wherein M is Zr or Hf, and R is Cl or $CH_3$.

26. A process according to paragraph 20, 21, 22, 23, 24, or 25 wherein said co-catalyst activator is selected from the group consisting of alumoxanes, modified alumoxanes, and ionic stoichiometric activators selected from the group consisting of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, and triphenylcarbenium tetrakis(perfluorophenyl)borate.

27. A process according to paragraph 20, 21, 22, 23, 24, 25, or 26 wherein the ethylene pressure ranges from about 344.7 kPa (50 psig) to about 4136.9 kPa (600 psig).

28. A process according to paragraph 20, 21, 22, 23, 24, 25, 26, or 27 wherein the ethylene-dicyclopentadiene copolymer composition prepared is contacted, either after recovery from or in situ within said polymerization mixture, with a derivatizing agent to bring about hydrogenation and/or epoxidation of the double bond in some or all of the cyclic co-monomers in said copolymer.

29. A process according to paragraph 28 wherein said prepared ethylene-dicyclopentadiene copolymer composition is contacted with hydrogen in the presence of a hydrogenation catalyst under hydrogenation reaction conditions of temperature and pressure suitable to effect hydrogenation of from about 70% to 100% of the double bonds within said ethylene-dicyclopentadiene copolymer composition.

30. A process according to paragraph 29 wherein said hydrogenation catalyst is selected from the group consisting of $RuClH(CO)(PPh_3)_3$, $Co(acac)_3/Bu_3Al$, nickel silica alumina, nickel/tungsten sulfides, Co-octanoate/$Et_3Al$, platinum/palladium, Pd/C, $Rh(PPh_3)_3Cl$ and combinations thereof (where Ph is phenyl, acac is acetyl acetonoate, Bu is butyl, and Et is ethyl), and wherein said hydrogenation reaction conditions include hydrogenation temperatures ranging from about 45° C. to about 180° C., and hydrogen pressures ranging from about 1379.0 kPa (200 psig) to about 11031.6 kPa (1600 psig).

31. A process according to paragraph 28 wherein said prepared ethylene-dicyclopentadiene copolymer composition is contacted in a solvent with a peroxide or peracid epoxidizing agent under epoxidation reaction conditions suitable to effect oxirane formation at from about 50% to 100% of the double bonds within said ethylene-dicyclopentadiene copolymer composition.

32. A process according to paragraph 31 wherein said solvent is selected from toluene and chloroform, said epoxidizing agent is selected from 3-chloroperbenzoic acid and combinations of hydrogen peroxide and formic acid, and said epoxidation reaction conditions include epoxidation temperatures ranging from about 0° C. to about 75° C.

Test Methods and Analytical Procedures

The various parameters and properties used to characterize the polymeric materials described herein can be determined using conventional or well known analytical or testing methodology, procedures and apparatus. For purposes of determining values for the parameters and characteristics provided for the materials of this invention, the following methods and procedures are employed.

Solution $^1H$ nuclear magnetic resonance (NMR) spectra of polymers were collected in $d_4$-o-dichlorobenzene ($d_4$-ODCB) or $d_2$-tetrachloroethane ($d_2$-TCE) at 120° C. on a JEOL Delta 400 spectrometer equipped with a 5 mm broadband probe or on a Varian UnityPlus 500 spectrometer equipped with a 5 mm switchable probe or a 5 mm broadband probe. Solution $^{13}C\{H\}$ NMR spectra of polymers were collected in $d_2$-TCE at 120° C. on a Varian UnityPlus 500 spectrometer equipped with a 10 mm broadband probe or a Varian Inova 300 spectrometer equipped with a 10 mm broadband probe. $Cr(acac)_3$ (~15 mg/mL) was used as a relaxation agent.

$^1H$ NMR mole % composition for EDCPD copolymers was determined by integrating the olefin resonances (5.6 and 5.5 ppm, total 2 H) and optionally the allylic bridgehead resonance (3.1 ppm, 1 H), the non-allylic bridgehead resonance (2.5 ppm, 1 H), and the cyclopentenyl $CH_2$ and chain CH resonances (2.2-1.9 ppm, total 4 H, when resolved). After correcting the rest of the aliphatic region for DCPD content, the remainder of the aliphatic integral was assigned to ethylene; no corrections were made for cyclohexane solvent. Residual solvent was estimated in weight per cent by integrating the cyclohexane peak at 1.4 ppm (overlapped) versus the total polymer integral. When reported, toluene and residual DCPD monomer contents were calculated using, respectively, the toluene aryl resonances (7.15-7.05 ppm, 5 H) and resolved DCPD monomer resonances (norbornene olefin peak just upfield of 6.0 ppm, 1 H; 3.25 ppm allylic bridgehead peak, 1 H; non-allylic bridgehead and cyclopentenyl $CH_2$, 2.95-2.7 ppm, 3 H). The aliphatic integral was also optionally corrected for toluene and DCPD monomer.

$^1H$ NMR mole % composition and per cent saturation for HEDCPD copolymers were determined by integrating the HDCPD bridgehead methine resonances (2.4 ppm, total 2 H) and any remaining DCPD olefin resonances (5.6 and 5.5 ppm, total 2 H). After correcting the aliphatic region for HDCPD and DCPD content, the remainder of the aliphatic integral was assigned to ethylene; no corrections were made for cyclohexane solvent. Residual solvent was estimated as wt % by integrating the sharp cyclohexane singlet peak at ~1.4 ppm (overlapped) versus the total polymer integral; residual $Ph_3P$ was estimated similarly using the phenyl resonances (7.8-7.1 ppm) versus the HDCPD peak at 2.4 ppm.

$^1H$ NMR mole % composition and per cent functionalization for epoxy-EDCPD copolymers was determined by integrating the epoxy-DCPD CHO resonances (3.4 and 3.3 ppm, total 2 H, plus optionally the bridgehead resonances at 2.4 and 2.3 ppm, 2 H), any remaining DCPD resonances (olefins at 5.6 and 5.5 ppm, total 2 H, and optionally the allylic bridgehead peak at 3.1 ppm, 1 H), and any signals from formate hemiesters ([—CH(OH)CH(OC(=O)H)—] units; 8.1-8.0 ppm (CH(OC(=O)H), 1 H) and 5.0 ppm (CH(OC(=O)H), 1 H)). After correcting the rest of the aliphatic region for epoxy-DCPD, DCPD, and formate hemiester content, the remainder of the aliphatic integral was assigned to ethylene. Ring-opened diol-DCPD units ([—CH(OH)CH(OH)—] units), when present, were quantified versus epoxy-DCPD units by $^{13}C$ NMR using the CHOH resonance at 76-80 ppm (2 C; after correction for 2 $\overline{C}$ of formate hemiester [—CH(OH)CH(OC(=O)H)—] unit, if present) versus the epoxy-DCPD CHO resonances (61.2 and 60.1 ppm, 2 C).

Gel Permeation Chromatography (GPC) molecular weights for copolymers reported versus polystyrene were determined using a Waters Associates 2000 Gel Permeation Chromatograph equipped with three Polymer Laboratories mixed bed high-porosity Type LS B columns (10 μm particle size, 7.8 mm inner diameter, 300 mm length) and an internal Waters differential refractive index (DRI) detector. The mobile phase was 1,2,4-trichlorobenzene (degassed and inhibited with 1.5 g/L of 2,6-di-t-butyl-4-methylphenol) at 135° C. (flow rate 1.0 mL/min; typical sample concentration 1.0 mg/mL; 301.5 μL injection loop). Alternately, a Waters Associates 150C High Temperature Gel Permeation Chromatograph equipped with three Polymer Laboratories mixed bed high-porosity Type B columns (of similar dimensions) and an internal DRI detector was used. The mobile phase was 1,2,4-trichlorobenzene at 145° C. (flow rate 0.5 mL/min; typical sample concentration 1-2 mg/mL). The DRI signal for EDCPD copolymers exhibited inverted polarity from the signal for homo-polyethylene. Polystyrene standards (17 in total) were used for instrument calibration. In some cases, molecular weight data was initially reported versus polyethylene standards (generating a polyethylene calibration curve via a universal calibration software program using the Mark-Houwink coefficients for polystyrene and polyethylene; see Sun, T.; Brant, P.; Chance, R. R.; Graessley, W. W. Macromolecules 2001, 34, 6812-6820). These values were converted back to polystyrene calibration values using the relationship: polystyrene-based molecular weight in kg/mol= [(polyethylene-based molecular weight in kg/mol)-(3.1692 kg/mol)]/(0.3914 kg/mol).

Differential Scanning Calorimetry (DSC) data were obtained on a TA Instruments model 2920 or 2910 calorimeter using a scan rate of 10 degrees per minute, typically from −40° C., 25° C., or 50° C. to ≧190° C. (preferably to 250° C.). Some samples were analyzed to 300° C. on the second heat; some epoxy-EDCPD copolymers were analyzed from low temperature (−110 or −125° C.) to 250° C. $T_g$ midpoint values and $T_m$ maximum values reported are from the second heat.

Chemical composition distribution (CCD) analysis was measured using a model 200 PolymerChar S. A. Crystallization Analysis Fractionation (CRYSTAF) instrument. The polymer sample (20-30 mg) was dissolved in 30 mL ODCB (stabilized with 0.125 g/L 2,6-di-t-butyl-4-methylphenol) at 160° C. for 60 minutes and equilibrated at 100° C. for 45 minutes, followed by cooling to 30° C. at a rate of 0.2 K/min (analysis time ~9 hours). A two-wavelength infrared detector was used to measure polymer concentration during crystallization (3.5 µm, 2853 cm$^{-1}$ sym. stretch) and to compensate for baseline drifts (3.6 µm) during analysis. The solution polymer concentration was monitored at intervals yielding a cumulative concentration curve. The derivative of this curve with respect to temperature represents the weight fraction of crystallized polymer at each temperature ("% soluble by CRYSTAF").

Infrared (IR) spectrometric analysis of copolymers was carried out on thin films cast from cyclohexane (EDCPDs and HEDCPDs) or CHCl$_3$ (epoxy-EDCPDs) onto NaCl disks, using a ThermoNicolet Nexus 470 spectrometer running OMNIC software.

Powder X-ray diffraction analysis (XRD) was performed using a Bruker Model D-8 Advance diffractometer equipped with a Cu X-ray tube, a monochromator, and a dynamic scintillation detector. A powdered sample of the polymer was evenly distributed onto a low-background holder and given a flat surface for presentation to the X-ray beam. EDCPD samples were analyzed in comparison to a crystalline homopolyethylene standard which exhibited strong reflections at 2θ=~22° (d=4.015 Å) and 2θ=~24° (d=3.6510 Å). In contrast, EDCPD samples exhibited only a broad amorphous enhancement at 2θ=~17°.

EXAMPLES

The preparation, characterization and subsequent hydrogenation and functionalization of the ethylene-DCPD copolymers herein can be illustrated by the following Examples:

Example 1

Synthesis of EDCPD copolymer at 60° C. and 300 psig (2058.4 kPa) ethylene

A 2 L stainless steel Zipperclave reactor was loaded with 1.0 L of a toluene solution (anhydrous grade toluene, dried over 3 Å molecular sieves and subsequently sparged with N$_2$) containing 721.9 g (5.46 mol) of dicyclopentadiene (passed through a column of activated Al$_2$O$_3$) and treated with 20 mL of a 1.0 M hexane solution of triisobutylaluminum (TIBAL) scavenger (20 mmol; Al:catalyst molar ratio 1014:1). The reactor was assembled and sealed, mechanical stirring was initiated, and the reactor was brought to 60° C. and pressurized with ethylene to 200 psig (1379.0 kPa). Polymerization was then initiated by injecting 20 mL of a toluene solution containing 8 mg (0.02 mmol) of µ-(CH$_3$)$_2$C(3-methylcyclopentadienyl)(9-fluorenyl)zirconium dimethyl (Catalyst-1) and 16 mg (0.02 mmol) N,N-dimethylanilinium tetrakis(pentafluorophenyl)borate (this solution was allowed to age for 10 minutes prior to use). The reactor pressure was then adjusted to 300 psig (2058.4 kPa) ethylene and this pressure was maintained throughout the course of the polymerization. After a reaction time of 30 minutes, the reactor was depressurized and stabilizers were added (200 mg Irganox® 1076 and 100 mg Irgafos® 168 dissolved in a minimal amount of hexane). The contents of the reactor were then added to a large beaker containing an excess of stirred methanol. The precipitated polymer was collected by filtration, washed several times with clean methanol, and dried under vacuum (0.01 torr; 1.3 Pa) at 50° C. for 12 hours. Following initial precipitation of the polymer, it was purified in portions by dissolving individual 100 g portions into 3 L toluene at 85° C., cooling to 50° C. once dissolution was complete, and precipitating into methanol after further subdivision of the portions (3 L methanol per 750 mL polymer solution). The weight of the dried hard, crystalline polymer was 390 g (catalyst activity 39.6 kg polymer/mmol catalyst·h and 48.8 kg polymer/g catalyst; catalyst productivity 216.8 kg polymer/g Zr). Characterization data is given in Table 1.

Spectral properties of a typical EDCPD copolymer prepared in Examples 1-8: $^1$H NMR (d$_4$-ODCB or d$_2$-TCE, 120° C.): δ 5.6 and 5.5 (each br s, total 2 H, DCPD olefin), 3.1 (br s, 1 H, DCPD allylic bridgehead), 2.5 (br s, 1 H, DCPD non-allylic bridgehead), 2.2 (br s, 2 H, cyclopentenyl CH$_2$), 2.15 (br s or d, 1 H, often overlapped with 2.2 ppm peak) and 1.9 (br s or d, 1 H) (DCPD chain CH), 1.7-1.5 (br m), 1.5-1.15 (br m with main peaks at 1.4, 1.3, and 1.2 ppm), 1.15-0.9 (br m or resolved d at 1.1 and 0.95 ppm) (remaining 4 H of DCPD+4 H of ethylene units). $^{13}$C{$^1$H} NMR (d$_2$-TCE, 120° C.): δ 133 and 131 (each s, total 2 C, DCPD olefin), 54 (s, 1 C, DCPD allylic bridgehead), 48-46 (br s or three resolved peaks, 1 C) and 46-44 (br s or three resolved peaks, 1 C) (DCPD chain CH), 43 (s, I C, DCPD non-allylic bridgehead), 42-40 (br s or two resolved peaks, 1 C, DCPD norbornyl CH near olefin), 39-37 (br s or two resolved peaks, 1 C, DCPD norbornyl CH away from olefin), 36 (br s, 1 C, norbornyl CH$_2$), 32 (s, 1 C, cyclopentenyl CH$_2$), 31-29 (br m, 2 C, ethylene units). IR (cast film from cyclohexane on NaCl): 3038 (m, $v_{olefin\ C-H}$), 2924 (vs), 2870 (m), 2849 (s), 1608 (w, $v_{c=c}$), 1462 (m), 1444 (m), 1352 (m), 1317 (w), 1294 (w), 1266 (m), 1254 (w), 1235 (w), 1198 (w), 1158 (w), 1121 (w), 1102 (w), 1088 (w), 1053 (w), 1029 (w), 945 (m), 922 (w), 868 (w), 798 (w), 718 (m), 685 (m) cm$^{-1}$.

Example 2

Synthesis of EDCPD copolymer at 60° C. and 300 psig (2058.4 kPa) ethylene

A procedure identical to Example 1 was carried out to give 287 g of a white, powdery/chunky polymer (catalyst activity 29.1 kg polymer/mmol catalyst·h and 35.9 kg polymer/g catalyst; catalyst productivity 159.5 kg polymer/g Zr). Characterization data is given in Table 1.

Example 3

Synthesis of EDCPD copolymer at 60° C. and 400 psig (2757.9 kPa) ethylene

A procedure similar to Example 1 was carried out using an ethylene polymerization pressure of 400 psig (2757.9 kPa) to give 197 g polymer (catalyst activity 20.0 kg polymer/mmol catalyst·h and 24.6 kg polymer/g catalyst; catalyst productivity 109.5 kg polymer/g Zr). Characterization data is given in Table 1.

Example 4

Synthesis of EDCPD copolymer at 60° C. and 400 psig (2757.9 kPa) ethylene

A procedure similar to Example 3 was carried out using 2 mg (0.005 mmol) of Catalyst-1 and 4 mg (0.005 mmol) N,N- dimethylanilinium tetrakis(pentafluoro-phenyl)borate (Al: catalyst molar ratio 4057:1). The polymer was purified by precipitation from toluene (2 L at room temperature) into methanol (6 L) to give 18.5 g of a white material (catalyst activity 7.5 kg polymer/mmol catalyst•h and 9.3 kg polymer/g catalyst; catalyst productivity 41.1 kg polymer/g Zr). A 13.8 g portion of the polymer was subsequently dissolved in 820 mL cyclohexane at room temperature (1.7 wt/vol %) over a 3-day period, filtered through a 60 mesh metal sieve to remove insolubles, and precipitated into room-temperature acetone (360 mL acetone per 100 mL polymer solution) to give 8.39 g of material which was dried in vacuum overnight at 50° C. and subsequently redried for an additional 4 days at 60° C. to remove residual solvent. The polymer exhibited no crystalline reflections in XRD analysis. Characterization ndata is given in Table 1.

Example 5

Synthesis of EDCPD copolymer at 60° C. and 300 psig (2058.4 kPa) ethylene

A procedure similar to Example 1 was carried out using 2 mg (0.005 mmol) of Catalyst-1 and 4 mg (0.005 mmol) N,N-dimethylanilinium tetrakis(pentafluoro-phenyl)borate (Al: catalyst ratio 4057:1). The polymer was purified by precipitation from toluene (2 L at room temperature) into methanol (6 L) to give 36.03 g of a white material (catalyst activity 14.6 kg polymer/mmol catalyst•h and 18.0 kg polymer/g catalyst; catalyst productivity 80.1 kg polymer/g Zr). A 30.0 g portion of the polymer was subsequently dissolved in 1.33 L cyclohexane at room temperature (2.25 wt/vol %) and reprecipitated into acetone as described in Example 4 (no filtration was necessary) to give 27.69 g of dry material. The polymer exhibited no crystalline reflections in XRD analysis. Characterization data is given in Table 1.

Example 6

Synthesis of EDCPD copolymer at 60° C. and 200 psig (1379.0 kPa) ethylene

A procedure similar to Example 1 was carried out at an ethylene pressure of 200 psig (1379.0 kPa) utilizing 2 mg (0.005 mmol) of Catalyst-1 and 4 mg (0.005. mmol) N,N-dimethylanilinium tetrakis(pentafluorophenyl)borate (Al: catalyst ratio 4057:1). The polymer was purified by precipitation from toluene (3 L at 80° C.) into methanol (6 L) to give 64.4 g of a white material (catalyst activity 26.1 kg polymer/mmol catalyst•h and 32.2 kg polymer/g catalyst; catalyst productivity 143.2 kg polymer/g Zr). A 54.8 g portion of the polymer was subsequently dissolved in 3.44 L cyclohexane at room temperature (1.6 wt/vol %) and reprecipitated into acetone as described in Example 4 to give 33.80 g of a white material. The polymer exhibited no crystalline reflections in XRD analysis. Characterization data is given in Table 1.

Example 7

Synthesis of EDCPD copolymer at 40° C. and 300 psig (2058.4 kPa) ethylene

A procedure similar to Example 1 was carried out at a polymerization temperature of 40° C. using 4 mg (0.01 mmol) Catalyst-1 and 8 mg (0.01 mmol) N,N-dimethylanilinium tetrakis(pentafluorophenyl)borate (Al:catalyst ratio 2029:1) to give 60 g of a white chunky polymer after reprecipitation from hot toluene (80° C.) into an excess of methanol (2.5 L methanol per 500 mL polymer solution) (catalyst activity 12.2 kg polymer/mmol catalyst•h and 15.0 kg polymer/g catalyst; catalyst productivity 66.7 kg polymer/g Zr). Characterization data is given in Table 1.

Example 8

Synthesis of EDCPD copolymer at 60° C. and 300 psig (2058.4 kPa) ethylene

A procedure identical to Example 3 was carried out to give 206 g of a white polymer (catalyst activity 20.9 kg polymer/mmol catalyst•h and 25.8 kg polymer/g catalyst; catalyst productivity 114.5 kg polymer/g Zr). Characterization data is given in Table 1.

TABLE 1

Properties of EDCPD copolymers prepared with Catalyst-1 (Examples 1-8).

| Ex. No. | Mole % DCPD[a] | $T_g$[b] | $T_m$[b] | GPC $M_w$ (TCB vs. PS)[c] | GPC $M_n$ (TCB vs. PS)[c] | CRYSTAF % sol. | Resid. lights[a] |
|---|---|---|---|---|---|---|---|
| 1 | 36.9 | 112.8 | none | 376,740 | 172,970 | — | — |
| 2 | 39.0 | 113.7 | none | 397,290 | 181,540 | 97.1 | — |
| 3 | 37.2 | 121.9 | none | 588,620 | 251,610 | 94.1 | — |
| 4 | 28.1 | 88.4[d] | none | 557,330 | 256,950 | 100.0 | 0.24 wt % CH |
| 5 | 32.1 | 103.3 | none | 551,680 | 280,870 | 95.7 | 0.05 wt % CH |
| 6 | 40.1 | 128.3[e] | none | 831,080 | 403,220 | 99.3 | 0.54 wt % CH |
| 7 | 36.0 | 126.0 | none | 793,500 | 377,630 | 98.3 | 1.0 mole % tol. |
| 8 | 31.5 | 94.9 | 125.4, vs[f] | 273,270 | 145,260 | 93.9 | — |

[a]1H NMR (CH = cyclohexane; tol. = toluene)
[b]By DSC, 2nd heat at 10° C./min heating rate; midpoint ($T_g$) or maximum ($T_m$).
[c]By GPC-DRI vs. polystyrene standards, in 1,2,4-trichlorobenzene at 135° C.; samples exhibited an opposite polarity over the entire molecular weight distribution as compared to homo-polyethylene.
[d]Very weak transition; 1st heat $T_g$ = 89.3° C.
[e]Value obtained at 5° C./min heating rate; 2nd heat $T_g$ too weak to quantify at 10° C./min (1st heat $T_g$ at 10° C./min = 130.2 C.).
[f]vs = Very small $T_m$; $\Delta H_f$~0.15 J/g.

Comparative Example C1

Synthesis of EDCPD Copolymer at 80° C. and 100 psig (689.5 kPa) Ethylene using Comparative Catalyst-2

Using a procedure similar to that given in Example 1, a 2 L autoclave was loaded with 1.0 L of a toluene solution containing dicyclopentadiene (721.9 g, 5.46 mol) and treated with 20 mL of a 1.0 M hexane solution of triisobutylaluminium (TIBAL) scavenger (20 mmol; Al:catalyst molar ratio 1004:1). The reactor was brought to 80° C. and pressured to 80 psig (551.6 kPa) ethylene. Polymerization was then initiated by injecting 25 mL of a toluene solution containing a mixture of μ-$(CH_3)_2$C(cyclopentadienyl)(9-fluorenyl)zirconium dimethyl (Catalyst-2) (7.8 mg, 0.02 mmol) and N,N-dimethylanilinium tetrakis(pentafluorophenyl)borate (17.2 mg, 0.021 mmol). Following the introduction of the active catalyst, the reactor pressure was increased to 100 psig (689.5 kPa) ethylene. After a reaction time of 1 h, the reactor was depressurized and the viscous reactor contents were divided into two portions, each of which was diluted with an equal volume of toluene to facilitate handling (total volume of each portion ~1.5 L). Each solution was treated with an excess of methanol (~3.5 L) containing ca. 50 mg Irganox® 1076 to precipitate the polymer, which was collected by filtration and dried under vacuum at 40° C. overnight (199.8 g, catalyst activity 10.0 kg polymer/mmol catalyst•h; 25.6 kg polymer/g catalyst; productivity 110.0 kg polymer/g Zr). The isolated lumpy material was cut with scissors into smaller (ca. 10 g) pieces and redissolved in portions in hot toluene (70° C.) containing Irganox® 1076 (~50 mg/L). The toluene solutions were cooled to 40° C. and precipitated into an excess of methanol (4:1 volume ratio), collected by filtration, washed with clean methanol, and dried under vacuum at 40° C. overnight to give a powdery white material (133.1 g). Characterization data is given in Table 2.

Comparative Example C2

Synthesis of EDCPD Copolymer at 60° C. and 100 psig (689.5 kPa) Ethylene using Comparative Catalyst-2

A procedure similar to that performed in Example C1 was carried out at 60° C. using 7.9 mg (0.02 mmol) Catalyst-2 and 23.4 mg (0.02 mmol) N,N-dimethylanilinium tetrakis(perfluoronaphthyl)borate (Al:catalyst molar ratio 992:1). A 195.3 g quantity of a white material was obtained (catalyst activity 9.7 kg polymer/mmol catalyst•h; 24.7 kg polymer/g catalyst; productivity 106.1 kg polymer/g Zr). Characterization data is given in Table 2.

Comparative Example C3

Synthesis of EDCPD Copolymer at 60° C. and 150 psig (1034.2 kPa) Ethylene using Comparative Catalyst-2

A procedure similar to Example C2 was carried out at an ethylene pressure of 150 psig (1034.2 kPa) for 0.5 h using 8 mg (0.02 mmol) Catalyst-2 and 18 mg (0.022 mmol) N,N-dimethylanilinium tetrakis(pentafluorophenyl)borate (Al:catalyst molar ratio 979:1). A 171 g quantity of a white material was obtained (catalyst activity 16.7 kg polymer/mmol catalyst•h; 21.4 kg polymer/g catalyst; productivity 91.8 kg polymer/g Zr). This material was further reprecipitated once more from toluene into methanol to remove free DCPD. The toluene polymer solution was filtered prior to precipitation to remove insolubles. Characterization data is given in Table 2.

Comparative Example C4

Repeat Synthesis of EDCPD Copolymer at 60° C. and 150 psig (1034.2 kPa) Ethylene using Comparative Catalyst-2

A procedure identical to Example C3 was carried out to give a 125 g quantity of a white polymer (catalyst activity 12.2 kg polymer/mmol catalyst•h; 15.6 kg polymer/g catalyst; productivity 67.1 kg polymer/g Zr). The additional toluene/methanol reprecipitation step with filtration described in Example C2 was not performed. Characterization data is given in Table 2.

Comparative Example C5

Repeat Synthesis of EDCPD Copolymer at 60° C. and 150 psig (1034.2 kPa) Ethylene using Comparative Catalyst-2

A procedure similar to Example C4 was carried out substituting N,N-dimethylanilinium tetrakis(perfluoronaphthyl)borate (25 mg) for N,N-dimethylanilinium tetrakis(pentafluorophenyl)borate. A 356 g quantity of a white material was obtained (catalyst activity 34.9 kg polymer/mmol catalyst•h; 44.5 kg polymer/g catalyst; productivity 191.1 kg polymer/g Zr). Characterization data is given in Table 2.

Comparative Example C6

Continuous Unit Synthesis of EDCPD Copolymer at 60° C. and 310 psig (2137.4 kPa) Ethylene using Comparative Catalyst-2

A 500 cc stainless steel, liquid-filled single-stage continuous autoclave reactor equipped with a stirrer, water cooling/steam heating element with a temperature controller, and a pressure controller was heated to 60° C. and pressurized to a constant pressure of 310 psig (2137.4 kPa) ethylene (purified by passage through molecular sieves and Selexsorb® CD). Stirring (500 rpm) was initiated. Separately, a solution of activated catalyst was prepared by mixing 800 mg (2.04 mmol) Catalyst-2 and 2.40 g (2.10 mmol) N,N-dimethylanilinium tetrakis(pentafluorophenyl)borate (activator:catalyst molar ratio 1.03:1) in 900 mL toluene (purified by passage through molecular sieves and Selexsorb® CD) for more than 10 minutes. A scavenger solution was separately prepared by dissolving 250 mL tri-n-octylaluminum (25 wt % in hexane) in 34.75 L toluene. A solution of DCPD diluted with toluene (dried over activated molecular sieves) was also separately prepared at a ratio of 200 mL toluene per 500 g DCPD, and subsequently passed through a column of activated $Al_2O_3$ in a drybox. Ethylene, DCPD solution, scavenger solution, and catalyst solution were then continuously fed into the reactor at rates of, respectively, 0.72 standard liters per minute (slpm) ethylene, 25 mL/min DCPD solution, and $2.27 \times 10^{-6}$ mole/minute catalyst, and $1.56 \times 10^{-5}$ mole/min scavenger (6.9:1 Al:Zr ratio). Once activity was established and the system reached a steady state, the reactor was operated at 60° C. and 310 psig (2137.4 kPa) ethylene for a time period of at least five times the mean residence time (0.5 h) prior to sample collection. The crude polymer product was then collected continuously in cans for 8 hours (yield=6.87 g polymer/minute; productivity=7.72 kg polymer/g catalyst•hr; DCPD conversion ~37%). Irgafos® 168 and Irganox® 1076 were added to the raw product as stabilizers upon product collection (~200 ppm of each stabilizer on a weight basis of polymer). The polymer product was recovered by precipitation into methanol (3:1 vol/vol methanol:polymer solution), collected by decantation, and dried under vacuum overnight at 60° C. overnight. This material was then dissolved in toluene (1:1 polymer:toluene weight ratio) at 80° C., reprecipitated by addition of methanol (3:1 vol/vol methanol:polymer solution), collected by vacuum filtration, and dried under vacuum overnight at 60° C. to give a white powder. Characterization data is given in Table 2.

Comparative Example C7

Synthesis of EDCPD Copolymer at 78.8° C. and 42 psig (289.5 kPa) Ethylene using Comparative Catalyst-2

A 500 g quantity of dicyclopentadiene (Aldrich Chemical Co.) was dissolved in 100 mL toluene (dried as described in Example 1) and the resulting solution was passed through a basic alumina column in a drybox. In the drybox, 150 mL of the solution was then sealed in a Wheaton bottle with a crimped septum-fitted top. A catalyst solution was prepared by dissolving 378 mg (0.965 mmol) Catalyst-2 and 320 mg (0.399 mmol) N,N-dimethylanilinium tetrakis(pentafluorophenyl)borate (activator:catalyst molar ratio 0.4:1) in 150 mL dry toluene. This solution was also sealed in a crimped Wheaton bottle with a septum cap. A scavenger solution consisting of 10 mL of a 1 M solution of triisobutylaluminum in toluene was sealed in a third Wheaton bottle (Al:Zr molar 10.4:1). The three solutions were removed from the drybox. A 500 mL autoclave was filled with 250 mL dry, deoxygenated toluene. The scavenger and dicyclopentadiene solutions were cannulated into the reactor using dried and purged 1/16th inch diameter tubing and a 3 psig (20.7 kPa) overpressure of dry nitrogen. The excess nitrogen in the autoclave was vented and the autoclave was heated to 78.8° C. After reaching a stable temperature, 42 psig (289.6 kPa) ethylene was introduced into the reactor and this pressure was maintained during the polymerization by adding ethylene through a Matheson flow controller. The catalyst solution was pumped into the autoclave using an Eldex HPLC pump. The pumping speed was held constant at 2 mL/minute. The polymerization was continued for 3898 seconds. During this time the temperature was maintained within 0.25° C. of 78.8° C. and the ethylene pressure was maintained within 1 psig (6.9 kPa) of 42 psig (289.6 kPa). At the end of the polymerization, the pressure was vented. The polymer solution was collected through the bottom autoclave drain in glass jars. The polymer was precipitated by addition to a large excess of methanol and the product was collected using a paper filter. The polymer was washed several times with clean methanol and was then redissolved in hot toluene (80 ° C.). The toluene solution was added to an excess of methanol and the precipitated polymer was again collected on a second paper filter. The reprecipitation step was repeated once more, and the polymer was subsequently collected and dried in a vacuum oven at 50° C. for 12 h to give 57.9 g of a white material. Characterization data is given in Table 2.

Comparative Example C8

Synthesis of EDCPD Copolymer at 80° C. and 55 psig (379.2 kPa) Ethylene using Comparative Catalyst-2

A procedure similar to Example C7 was carried out at an ethylene pressure of 55 psig (379.2 kPa) for 980 seconds. During this time the temperature was maintained within 2° C. of 80° C. and the ethylene pressure was maintained within 1 psig (6.9 kPa) of 55 psig (379.2 kPa). After two reprecipitation steps and drying, 73.7 g of a white polymer product was collected. Characterization data is given in Table 2.

Comparative Example C9

Synthesis of EDCPD Copolymer at 80° C. and 200 psig (1379.0 kPa) Ethylene using Comparative Catalyst-2

A procedure similar to Example C1 was carried out at an ethylene pressure of 200 psig (1379.0 kPa) for 1.0 h at 80° C. using 8 mg (0.02 mmol) Catalyst-2 and 18.1 mg (0.023 mmol) N,N-dimethylanilinium tetrakis(pentafluorophenyl) borate (Al:Zr molar ratio 979:1). The extremely viscous polymer solution was removed from the reactor, diluted with an equal volume of toluene, and divided into 4 portions (each ~400 mL). A large excess of methanol (~3 L) containing ~50 mg Irganox® 1076 was added to each portion. A 200.4 g quantity of a white material was obtained after filtration and drying overnight under vacuum (catalyst activity 9.8 kg polymer/mmol catalyst•h; 25.1 kg polymer/g catalyst; productivity 107.6 kg polymer/g Zr). The crude material was divided into two portions, each of which was dissolved gradually in ~3 L of hot toluene containing ~50 mg/L frganox® 1076. These solutions were further separately divided into 4 portions, each of which was treated with excess methanol to precipitate the polymer (typically adding the polymer solution to ~3 L stirred methanol containing ~50 mg/L Irganox® 1076). After collection by filtration and drying overnight under vacuum at 40° C., 146.3 g of a white material (mixed solid/powder) was obtained.

This sample exhibited an inferior solubility in CRYSTAF analysis. DSC analysis revealed a distinct $T_m$ in the expected temperature range for homo-polyethylene. GPC analysis also indicated a compositional inhomogeneity over the copolymer molecular weight distribution, as evidenced by a polarity inversion of the DRI signal to that for homo-polyethylene at the high-molecular-weight side of the distribution. Characterization data is given in Table 2.

Comparative Example C10

Synthesis of EDCPD Copolymer at 80° C. and 300 psig (2058.4 kpa) Ethylene using Comparative Catalyst-2

A procedure similar to Example C1 was carried out at an ethylene pressure of 300 psig (2058.4 kPa) for 1.0 h at 80° C. using 7.9 mg (0.02 mmol) Catalyst-2 and 16.2 mg (0.02 mmol) N,N-dimethylanilinium tetrakis(pentafluorophenyl) borate (Al:Zr molar ratio 992:1). The polymer solution from the reactor was diluted with ~1 L of toluene and divided into 3 portions (ca. 1 L each), each of which was added to 3 L of rapidly stirred methanol containing ~50 mg Irganox® 1076. The precipitated blobby polymer was compacted by pressing with a spatula, cut into thin strips, and isolated by decantation of solvents. A 240.4 g quantity of a white material was obtained after drying overnight under vacuum at 40° C. (catalyst activity 11.9 kg polymer/mmol catalyst•h; 30.4 kg polymer/g catalyst; productivity 130.4 kg polymer/g Zr). The crude material was redissolved in hot toluene (100° C.) at a ratio of 3 L toluene (containing ~50 mg Irganox® 1076) per 100 g of polymer. The resultant solutions were divided into ~1 L portions, each of which was added to ~3 L rapidly stirred methanol to give "pillows" of polymer which were pressed with a spatula to remove entrained monomer and solvent. After removal of solvents by decantation, these "pillows" were further squeezed to expel liquids, cut into half-inch strips, and dried overnight under vacuum at 40° C. to give 184.12 g of material.

This sample exhibited an inferior solubility in CRYSTAF analysis. DSC analysis revealed a distinct $T_m$ in the expected temperature range for homo-polyethylene. GPC analysis also indicated a compositional inhomogeneity over the copolymer molecular weight distribution, as evidenced by a polarity inversion of the DRI signal to that for homo-polyethylene at the high-molecular-weight side of the distribution. Characterization data is given in Table 2.

Comparative Example C11

Synthesis of EDCPD Copolymer at 80° C. and 400 psig (2757.9 kPa) Ethylene using Comparative Catalyst-2

A procedure similar to Example C1 was carried out at an ethylene pressure of 400 psig (2757.9 kPa) for 1.0 h at 80° C. using 7.3 mg (0.019 mmol) Catalyst-2 and 15.4 mg (0.019 mmol) N,N-dimethylanilinium tetrakis(pentafluorophenyl) borate (Al:Zr molar ratio 1073:1). The viscous polymer solution from the reactor was diluted with ~1 L of toluene and divided into 3 portions (ca. 1 L each), each of which was added to 3 L of rapidly stirred methanol containing ~50 mg Irganox® 1076. The precipitated polymer "pillows" were pressed with a spatula to remove entrained liquids, cut into small strips, and dried under vacuum overnight at 40° C. A 243.8 g quantity of a white material was obtained (catalyst activity 13.1 kg polymer/mmol catalyst•h; 33.4 kg polymer/g catalyst; productivity 143.5 kg polymer/g Zr). The crude material was gradually redissolved in hot toluene (100° C.) at a ratio of ~1 L toluene (containing ~50 mg Irganox® 1076) per 50 g of polymer. The resultant solutions were divided into smaller portions for ease of handling. Each solution was added to rapidly stirred methanol (containing ~50 mg Irganox® 1076 per 3 L) at a ratio of 1:3 v/v polymer solution: methanol. The precipitated polymer "pillows" were pressed with a spatula and cut into strips as described above, and dried overnight at 40° C. under vacuum to give 194.8 g of material.

This sample exhibited an inferior solubility in CRYSTAF analysis. DSC analysis revealed a distinct $T_m$ in the expected temperature range for homo-polyethylene. GPC analysis also indicated a compositional inhomogeneity over the copolymer molecular weight distribution, as evidenced by a polarity inversion of the DRI signal to that for homo-polyethylene at the high-molecular-weight side of the distribution. Characterization data is given in Table 2.

in g/mL) and the reactor was assembled. After mechanical stirring was initiated, the reactor was pressurized to 200 psig (1379.0 kPa) $H_2$ and vented three times, followed by repressurization to 800 psig (5515.9 kPa) $H_2$ (single charge). The temperature was raised to 105° C. and the contents of the reactor were stirred at 105° C. overnight (20-22 h); during the early hours of the reaction, the hydrogen pressure was raised back to 800 psig (5515.9 kPa) if necessary. The reactor was cooled and vented, and its contents were precipitated into acetone (ca. 300 mL acetone per 100 mL of polymer solution) giving a lumpy white solid. After manually cutting large solids into smaller pieces, the entire polymer solution (precipitate+solvents) was agitated in a Waring blender. The shredded polymer was collected by filtration, rinsed with boiling acetone, and then twice redissolved in cyclohexane (2.25 wt/vol % polymer; very viscous solution; some gels were observed) at 80° C., reprecipitated into boiling acetone (360 mL acetone per 100 mL polymer solution), and re-shredded in a Waring blender. After collection by filtration, the white powdery polymer was dried at 80° C. for 4 days under vacuum (28.4 g, theo. yield 29.8 g; 95%). Characterization data is given in Table 3.

Spectral properties of a typical HEDCPD copolymer prepared in Examples 9-17: $^1$H NMR ($d_4$-ODCB or $d_2$-TCE, 120° C.): δ 2.4 (s, 2 H, pendant bridgehead CH), 2.0 and 1.89

TABLE 2

Properties of comparative EDCPD copolymers prepared with Catalyst-2 (Examples C1-C11).

| Ex. No. | Mole % DCPD[a] | $T_g{}^b$ | $T_m{}^b$ | GPC $M_w$ (TCB vs. PS)[c] | GPC $M_n$ (TCB vs. PS)[c] | CRYSTAF % sol. | Resid. lights (mole %)[a] |
|---|---|---|---|---|---|---|---|
| C1  | 38.5    | 151.0  | none    | 150,510 | 83,060 | 100.0    | 2.6 tol. |
| C2  | 43.6    | 150.5  | none    | 170,570 | 81,960 | 96.9     | 1.7 tol. |
| C3  | 43.6    | 145.9  | none    | 175,450 | 83,040 | 95.7     | 0.7 tol. |
| C4  | 43.4    | 144.8  | none    | 152,790 | 69,910 | 97.1     | 3.1 tol. |
| C5  | 45.7    | 156.7  | none    | 113,720 | 34,950 | 97.6     | 3.6 tol. |
| C6  | 39.4    | 149.1  | none    | 183,230 | 61,990 | 100.0    | 0.9 tol. |
| C7  | 41.4    | 148.8  | none    | 221,310 | 75,830 | NA[d]    | 1.4 DCPD, 0.2 tol. |
| C8  | 36.9    | 148.7  | none    | 331,020 | 76,420 | NA[d]    | 2.0 DCPD, 2.5 tol. |
| C9  | 30.4[e] | 136.7  | 124.6[h] | NA[g]  | NA[g]  | 83.5     | 2.7 tol. |
| C10 | 25.3[e] | hid.[f]| 124.0[h] | NA[g]  | NA[g]  | 78.4     | 0.3 tol. |
| C11 | 18.0[e] | 111.4  | 122.8[h] | NA[g]  | NA[g]  | 62.3[i]  | 0.03 tol. |

[a]$^1$H NMR (tol. = toluene; DCPD = residual DCPD monomer; mole % DCPD incorporated not corrected for toluene or residual DCPD monomer content).
[b]By DSC, 2$^{nd}$ heat at 10° C./min heating rate; midpoint ($T_g$) or maximum ($T_m$).
[c]By GPC-DRI vs. polyethylene standards, in 1,2,4-trichlorobenzene at 135° C. or 145° C.; converted to polystyrene values using the formula: polystyrene-based molecular weight in kg/mol = [(polyethylene-based molecular weight in kg/mol) − (3.1692 kg/mol)]/(0.3914 kg/mol). Unless indicated, samples exhibited an opposite polarity over the entire molecular weight distribution as compared to homo-polyethylene. The molecular weights listed in Table 2 are in g/mole.
[d]NA = not available.
[e]These values represent the entire sample (i.e., are not corrected for the presence of homo-polyethylene).
[f]$T_g$ overlapped by $T_m$.
[g]Sample showed a gradual inversion of DRI signal polarity over the molecular weight distribution, with the high end of the molecular weight distribution exhibiting the same polarity as homo-polyethylene.
[h]Estimated $\Delta H_f$s for $T_m$ transitions: C9, ≧0.67 J/g; C10, ≧1.22 J/g; C11, 2.41 J/g.
[i]Sample showed a 62.3% soluble fraction attributed to EDCPD plus 15.5% of a second, unidentified soluble fraction.

Example 9

Synthesis of Hydrogenated EDCPD (HEDCPD) Copolymer from EDCPD Copolymer Prepared in Example 1

A 29.5 g portion of the copolymer prepared in Example 1 (163.7 mmol DCPD units) was placed in a glass bottle along with a stirbar and 480 mL o-dichlorobenzene (ODCB). This mixture was stirred overnight at room temperature to affect dissolution of the polymer, and the resultant solution was transferred to a 2 L linerless Hastelloy C Parr reactor. Separately, 132 mg (Ph$_3$P)$_3$RhCl (0.143 mmol, 1145:1 DCPD:Rh) and 1.29 g Ph$_3$P (4.92 mmol, 34.4:1 P:Rh) were each dissolved in 10 mL ODCB. Both solutions were added to the polymer solution (final polymer concentration 5.9 wt/vol %

(two overlapped peaks, total 2 H), 1.8 (s, 2 H), 1.75-1.15 (m with main peaks at 1.65 (or br d at 1.65 and 1.60), 1.5, and 1.3 (6 H from HDCPD+4 H from ethylene units), 1.1 (br s, 2 H, DCPD). The characteristic DCPD olefin (5.6 and 5.5 ppm) and DCPD cyclopentenyl bridgehead (3.1 and 2.5 ppm) peaks of the precursor EDCPD materials were absent. $^{13}$C{$^1$H} NMR (d$_2$-TCE, 120° C.): δ 49.0 (minor), 47.4, 47.2, 46.8, 46.5 (major) (partially resolved cluster of four main peaks, 4 C, DCPD CH), 39.4 (major), 38.7, 38.2 (partially resolved cluster of three main peaks, 2 C from DCPD CH+1 C from DCPD CH$_2$), 32.5 (minor), 30.7, 30.5, 30.1, 30.0, 29.7, 29.5 (major) (partially resolved cluster of six main peaks, 1 C from DCPD CH$_2$+2 C from ethylene units), 26.8 (s, 2 C, DCPD CH$_2$) (some spectra showed additional splitting of peak clusters). The characteristic DCPD olefin (133 and 131 ppm) and DCPD allylic bridgehead (54 ppm) peaks of the precursor EDCPD materials were absent. IR (cast film from cyclohexane on NaCl): 2940 (vs), 2925 (vs), 2871 (sh), 2851 (s), 1465 (m), 1445 (m), 1362 (w), 1326 (w), 1297 (w), 1274 (w), 1247 (w), 1186 (w), 1170 (w), 1142 (w), 1117 (w), 1065 (w), 1020 (w), 970 (w), 948 (w), 921 (w), 903 (w), 892 (w), 860 (w), 834 (w), 786 (w), 726 (w), 694 (w) cm$^{-1}$. The characteristic bands seen in the precursor EDCPD material at 3038 (m, $v_{olefin\ C-H}$) and 1608 (w, $v_{C=C}$) were absent.

Example 10

Synthesis of HEDCPD Copolymer from EDCPD Copolymer Prepared in Example 2

A 50.0 g portion of the copolymer prepared in Example 2 (283.95 mmol DCPD units) was hydrogenated using a procedure identical to Example 9. The amounts of reagents used were 750 mL ODCB (6.7 wt/vol % polymer concentration), 469 mg (Ph$_3$P)$_3$RhCl (0.507 mmol, 560:1 DCPD:Rh), and 4.59 g Ph$_3$P (17.5 mmol, 34.5:1 P:Rh). Following workup, a 46.9 g portion (theo. yield 50.6 g, 93%) of a white powder was obtained. A small amount of residual unsaturation was observed by $^1$H NMR. Characterization data is given in Table 3.

Example 11

Synthesis of HEDCPD Copolymer from EDCPD Copolymer Prepared in Example 2

A 5 g portion of the copolymer prepared in Example 2 (28.40 mmol DCPD units) was hydrogenated in ODCB solvent using a procedure similar to Example 9 using a glass-lined 300 mL Hasteloy C Parr reactor. Dissolution of the copolymer was performed directly in the glass liner of the Parr reactor (the stirbar was removed prior to reactor assembly). The amounts of reagents used were 150 mL ODCB (3.3 wt/vol % polymer concentration; some insolubles observed), 94 mg (Ph$_3$P)$_3$RhCL (0.102 mmol, 278:1 DCPD:Rh), and 914 mg Ph$_3$P (3.48 mmol, 34.2:1 P:Rh). Following two cycles of reprecipitation from cyclohexane/acetone and collection as described in Example 9 (some insolubles were observed upon redissolution in cyclohexane) and drying at 80° C. under vacuum overnight, a 4.66 g portion (theo. yield 5.1 g, 92%) of a white granular powder was obtained. Characterization data is given in Table 3.

Example 12

Synthesis of HEDCPD Copolymer from EDCPD Copolymer Prepared in Example 3

A 29.5 g portion of the copolymer prepared in Example 3 (164.29 mmol DCPD units) was hydrogenated using a procedure identical to Example 9. The amounts of reagents used were 500 mL ODCB (5.7 wt/vol % polymer concentration), 284 mg (Ph$_3$P)$_3$RhCl (0.307 mmol, 535:1 DCPD:Rh), and 2.78 g Ph$_3$P (10.6 mmol, 34.5:1 P:Rh). Following workup, a 28.5 g portion (theo. yield 29.8 g, 96%) of a white powder was obtained. Characterization data is given in Table 3.

Example 13

Synthesis of HEDCPD Copolymer from EDCPD Copolymer Prepared in Example 4

A 3 g portion of the copolymer prepared in Example 4 (14.71 mmol DCPD units) was hydrogenated in cyclohexane using a procedure similar to Example 9. The amounts of reagents used were 100 mL total cyclohexane (3.0 wt/vol % polymer concentration), 48 mg (Ph$_3$P)$_3$RhCl (0.052 mmol, 283:1 DCPD:Rh), and 470 g Ph$_3$P (1.79 mmol, 34.5:1 P:Rh). The catalyst and Ph$_3$P were combined in 50 mL of cyclohexane and heated for 30 minutes at 70° C. to achieve full dissolution before being added to the polymer solution. Following one reprecipitation step from cyclohexane/acetone and collection as described in Example 9 (agitation in a blender was not required) and drying at 60° C. under vacuum for 3 days, a 2.98 g portion (theo. yield 3.03 g, 98%) of a fluffy white powder was obtained. Characterization data is given in Table 3.

Example 14

Synthesis of HEDCPD Copolymer from EDCPD Copolymer Prepared in Example 5

An 18 g portion of the copolymer prepared in Example 5 (93.97 mmol DCPD units) was hydrogenated in cyclohexane using a 2 L linerless Hastelloy C Parr reactor and a procedure similar to Example 13. The amounts of reagents used were 600 total mL cyclohexane (3.0 wt/vol % polymer concentration; 100 mL used to predissolve catalyst/Ph$_3$P), 309 mg (Ph$_3$P)$_3$RhCl (0.334 mmol, 281:1 DCPD:Rh), and 3.03 g Ph$_3$P (11.6 mmol, 34.7:1 P:Rh). Following reprecipitation, collection, and drying as described in Example 13, a 17.23 g portion (theo. yield 18.20 g, 95%) of a fluffy white powder was obtained. Characterization data is given in Table 3.

Example 15

Synthesis of HEDCPD Copolymer from EDCPD Copolymer Prepared in Example 6

A 24 g portion of the copolymer prepared in Example 6 (137.83 mmol DCPD units) was hydrogenated in cyclohexane using a 2 L linerless Hastelloy C Parr reactor and a procedure similar to Example 13. The amounts of reagents used were 800 mL cyclohexane (3.0 wt/vol % polymer concentration; 100 mL used to predissolve catalyst/Ph$_3$P), 451 mg (Ph$_3$P)$_3$RhCl (0.487 mmol, 283:1 DCPD:Rh), and 4.41 g Ph$_3$P (16.8 mmol, 34.5:1 P:Rh). Following hydrogenation, $^1$H NMR analysis of a precipitated aliquot of polymer revealed a small amount of residual unsaturation. A second loading of (Ph$_3$P)$_3$RhCl (225 mg, 0.243 mmol) and Ph$_3$P (2.20 g, 8.39 mmol) in 100 mL cyclohexane was added (final polymer concentration 2.7 wt/vol %; final DCPD:Rh ratio 189:1), and the sample was re-hydrogenated. When the crude sample (22.0 g, theo. yield 24.3 g, 91%) was redissolved in cyclohexane at 70° C. for purification as decribed in Example 13, a large portion of insolubles was observed. The polymer slurry/solution was filtered through a 60 mesh metal sieve and the soluble portion was precipitated into acetone to, give a fine white powder. The insoluble portion was slurried in boiling acetone to remove residual Ph$_3$P, agitated in a Waring blender (as an acetone slurry), and re-collected by filtration to give a light brown granular powder. Both portions were dried under vacuum at 60° C. for 3 days (6.3 g, cyclohexane-soluble portion, 15-S; 15.2 g cyclohexane-insoluble portion, 15-I) and exhibited complete solubility in ODCB at 120° C. Characterization data for both portions is given in Table 3.

Example 16

Synthesis of HEDCPD Copolymer from EDCPD Copolymer Prepared in Example 7

A glass liner for a 300 cc Hasteloy C Parr reactor was charged with 140 mL toluene, a stirbar, and 5 g of the EDCPD copolymer prepared in Example 7 (27.46 mmol DCPD units). The solution was stirred overnight at room temperature to effect dissolution of the polymer. The stirbar was then removed and the liner was inserted into the Parr reactor. Separately, 91 mg (Ph$_3$P)$_3$RhCl (0.098 mmol, 280:1 DCPD:Rh) and 888 mg Ph$_3$P (3.39 mmol, 34.6:1 P:Rh) were each dissolved in 5 mL toluene. Both solutions were added to the polymer solution (final polymer concentration 3.3 wt/vol %) and the reactor was assembled. After mechanical stirring was initiated, the reactor was pressurized to 200 psig (1379.0 kPa) H$_2$ and vented three times, followed by repressurization to 800 psig (5515.9 kPa) H$_2$ (single charge). The temperature was raised to 105° C. and the contents of the reactor were stirred at 105° C. overnight (20-22 h); during the early hours of the reaction, the hydrogen pressure was raised back to 800 psig (5515.9 kPa) if necessary. The reactor was cooled and vented, and its contents were precipitated into acetone (ca. 300 mL acetone per 100 mL of polymer solution) giving a lumpy white solid. After manually cutting large solids into smaller pieces, the entire polymer solution (precipitate+solvents) was agitated in a Waring blender. The shredded polymer was collected by filtration, rinsed with boiling acetone, and then twice redissolved in cyclohexane (2.25 wt/vol % polymer; some gels were observed) at 80° C., reprecipitated into boiling acetone (360 mL acetone per 100 mL polymer solution), and re-shredded in a Waring blender. After collection by filtration, the white granular polymer was dried at 80° C. overnight, and then re-dried under vacuum at 40° C. for >3 days to remove residual solvent (4.91 g, theo. yield 5.055 g; 97%). Characterization data is given in Table 3.

Example 17

Synthesis of HEDCPD Copolymer from EDCPD Copolymer Prepared in Example 8

A 49.0 g portion of the copolymer prepared in Example 8 (253.62 mmol DCPD units) was hydrogenated using a procedure identical to Example 9. The amounts of reagents used were 750 mL ODCB (6.5 wt/vol % polymer concentration), 415 mg (Ph$_3$P)$_3$RhCl (0.449 mmol, 565:1 DCPD:Rh), and 4.06 g Ph$_3$P (15.5 mmol, 34.5:1 P:Rh). Following workup, a 48.9 g portion (theo. yield 49.49 g, 99%) of a whitish-grey, sandy powder was obtained. Characterization data is given in Table 3.

Comparative Example C12

Synthesis of HEDCPD Copolymer from EDCPD Copolymer Prepared in Example C1

An 8 g quantity of the copolymer prepared in Example C1 (45.20 mmol DCPD units) was dissolved in 140 mL anhydrous o-dichlorobenzene (degassed by freeze-pump-thaw cycles and dried over activated 4 Å molecular sieves) at room temperature overnight in a glass liner for a 300 mL Parr reactor (reagent-grade, non-anhydrous ODCB may be optionally used instead). Separately, Rh(PPh$_3$)$_3$Cl (74 mg, 0.08 mmol) and Ph$_3$P (734 mg, 2.8 mmol) were each dissolved in 5 mL ODCB and added to the polymer solution. The polymer solution was then hydrogenated at 45° C. overnight at 800 psig (5515.9 kPa) H$_2$ using a procedure similar to Example 9. Subsequently, the reactor was vented, opened, and additional charges of Rh(PPh$_3$)$_3$Cl and triphenylphosphine in ODCB (identical quantities) were added (final polymer concentration 5.0 wt/vol %; 35.0:1 P:Rh; final diene:Rh 283:1). The polymer was then rehydrogenated overnight at 105° C. and 800 psig (5515.9 kPa) H$_2$ and precipitated into excess methanol (agitating the precipitated polymer slurry in a Waring blender). Following collection by filtration, the polymer was redissolved in tetrachloroethane (TCE) at 80-85° C. (ca. ⅗ original volume of ODCB), filtered to remove decomposed catalyst particles, and reprecipitated into methanol (agitating the precipitated polymer slurry in a Waring blender). A 6.0 g quantity of white polymer (theo. yield 8.09 g; 74%) was obtained after drying in a vacuum oven overnight or longer at 40-60° C. Characterization data is given in Table 4.

Comparative Example C13

Synthesis of HEDCPD Copolymer from EDCPD Copolymer Prepared in Example C5

A 90 g portion of the copolymer prepared in Example C5 (543.69 mmol DCPD units) was divided into nine individual portions of 10 g (60.41 mmol DCPD units), each of which was hydrogenated using a procedure similar to Example C12 except that only one charge of catalyst and Ph$_3$P was used and hydrogenation was carried out at 105° C. for one overnight period. The amounts of reagents used for each portion were 140 mL ODCB (to dissolve the copolymer), 100 mg (0.108 mmol) Rh(PPh$_3$)$_3$Cl in 5 mL ODCB, and 976 mg (3.72 mmol)

TABLE 3

Properties of HEDCPD copolymers prepared in Examples 9-17.

| Ex. No. | Mole % HDCPD (% resid. olefin)$^a$ | $T_g{}^b$ | $T_m{}^b$ | GPC $M_w$ (TCB vs. PS)$^c$ | GPC $M_n$ (TCB vs. PS)$^c$ | Resid. lights (wt %)$^a$ |
|---|---|---|---|---|---|---|
| 9 | 34.0 | 111.5 | none | 342,850 | 167,720 | none |
| 10 | 35.3 (0.3) | 112.8 | none | 355,900 | 161,580 | none |
| 11 | 35.2 | 113.8 | none | 374,680 | 146,180 | 0.04 CH |
| 12 | 36.3 | 119.3 | none | 558,880 | 261,370 | none |
| 13 | 29.4 | 83.0 | none | 277,590$^d$ | 227,270$^d$ | none |
| 14 | 32.1 | 98.3 | none | 380,860 | 215,080 | 0.10 CH |
| 15-S | 41.5 (1.2) | 124.2 | none | 497,630 | 207,770 | 0.04 CH |
| 15-I | 40.4 (0.7) | 126.8 | none | 611,880 | 197,980 | 0.45 CH |
| 16 | 33.7 | 111.3 | none | 816,620 | 414,880 | 1.41 CH |
| 17 | 30.0 | 89.9 | 126.8, vs$^e$ | 256,850 | 159,840 | 0.56 CH |

$^a$$^1$H NMR (CH = cyclohexane).
$^b$By DSC, 2$^{nd}$ heat at 10° C./min heating rate; midpoint ($T_g$) or maximum ($T_m$).
$^c$By GPC-DRI vs. polystyrene standards, in 1,2,4-trichlorobenzene at 135° C.. Unless indicated, samples exhibited an opposite polarity over the entire molecular weight distribution as compared to homo-polyethylene. Molecular weights are in g/mol.
$^d$Analysis complicated by low solubility and weak DRI signal. Sample exhibited polarity inversion of DRI signal over run; however, this appears to reflect difficulties with analysis rather than compositional inhomogeneity.
$^e$vs = Very small $T_m$; $\Delta H_f$~0.22 J/g.

triphenylphosphine in 5 mL ODCB (final polymer concentration 6.7 wt/vol %; 34.5:1 P:Rh; final diene:Rh 560:1). Following two reprecipitations from TCE and drying, a combined 87.7 g portion (theo. yield 91.1 g, 96%) of a white solid was obtained, which exhibited residual TCE by $^1$H NMR. A 41 g portion of this material was dissolved in 1.8 L cyclohexane and precipitated by addition to 6.0 L acetone but still showed residual TCE after drying at 80° C. under vacuum overnight. The material was redissolved in 500 mL toluene and reprecipitated by addition of 4.0 L boiling methanol, followed by a second dissolution in TCE (1.8 L) and reprecipitation into boiling acetone (6.0 L). The polymer was collected by filtration and dried at 80° C. under vacuum for a total of six days to give 39 g of a white solid. Characterization data is given in Table 4.

Comparative Example C14

Synthesis of HEDCPD Copolymer from EDCPD Copolymer Prepared in Example C6

A 100 g portion of the copolymer prepared in Example C6 (570.3 mmol DCPD units) was hydrogenated using a procedure identical to Example C13 in a 2 L linerless Parr reactor. The amounts of reagents used were 1300 mL ODCB (to dissolve the copolymer), 942 mg (1.02 mmol) Rh(PPh$_3$)$_3$Cl in 100 mL ODCB, and 9.22 g (35.13 mmol) triphenylphosphine in 100 mL ODCB (final polymer concentration 6.7 wt/vol %; P:Rh 34.4:1; final diene:Rh 560:1). Following initial collection of the crude polymer and two reprecipitations from TCE and drying, 90.8 g (theo. yield 101.2 g, 90%) of a white solid was obtained, which exhibited residual TCE by $^1$H NMR. A 50 g portion of this material was dissolved in 500 mL toluene, heated at reflux for a 30 minute period, precipitated by addition of a large excess of methanol, rinsed with a large excess of boiling methanol, and collected and dried under vacuum at 80° C. To remove residual toluene, this material was then dissolved in cyclohexane at room temperature (2.0 L) and reprecipitated into acetone (7.0 L) followed by agitation of the precipitated mixture in a Waring blender. A fine white powder (44 g after collection and drying) was obtained. Characterization data is given in Table 4.

Comparative Example C15

Repeat Synthesis of HEDCPD Copolymer from EDCPD Copolymer Prepared in Example C6 in Cyclohexane A 10 g portion of the copolymer prepared in Example C6 (57.03 mmol DCPD units) was hydrogenated using a procedure similar to Example C14 except that hydrogenation was conducted in anhydrous cyclohexane solvent and the following variation was performed: Rh(PPh$_3$)$_3$Cl (94 mg, 0.102 mmol) and triphenylphosphine (922 mg, 3.52 mmol) were combined in 150 mL anhydrous cyclohexane in the glass liner of the Parr reactor and heated at 70° C. for 30 minutes with stirring. Subsequently, the copolymer was added to this solution (final polymer concentration 6.7 wt/vol %; P:Rh 34.5:1; final diene:Rh 559:1) and stirring was continued until dissolution was complete. Hydrogenation was then carried out at 800 psig (5515.9 kPa) H$_2$ and 105° C. overnight and the crude polymer was isolated by precipitation into 500 mL acetone (agitating the precipitated solution in a Waring blender). After collection by filtration, the crude material was purified by two cycles of dissolution in cyclohexane (450 mL) and precipitation into boiling acetone (1.6 L). A yield of 9.47 g (theo. yield 10.1 g, 94%) of a white solid was obtained after drying at 80° C. overnight under vacuum. Characterization data is given in Table 4.

Comparative Example C16

Synthesis of HEDCPD Copolymer from EDCPD Copolymer Prepared in Example C7

A 6.0 g portion of the copolymer prepared in Example C7 (34.90 mmol DCPD units) was hydrogenated using a procedure identical to Example C12. The amounts of reagents used were 140 mL ODCB (to dissolve the copolymer), two charges of 57.6 mg (0.0624 mmol) Rh(PPh$_3$)$_3$Cl in 5 mL ODCB, and two charges of 564 mg (2.15 mmol) triphenylphosphine in 5 mL ODCB (final polymer concentration 3.75 wt/vol %; final diene:Rh 280:1). Following reprecipitation from TCE into methanol and drying, 3.62 g (theo. yield 6.07 g, 60%) of a white solid was obtained. Characterization data is given in Table 4.

Comparative Example C17

Synthesis of HEDCPD Copolymer from EDCPD Copolymer Prepared in Example C8

An 8.0 g portion of the copolymer prepared in Example C8 (44.40 mmol DCPD units) was hydrogenated using a procedure identical to Example C12. The amounts of reagents used were 140 mL ODCB (to dissolve the copolymer), two charges of 73 mg (0.0793 mmol) Rh(PPh$_3$)$_3$Cl in 5 mL ODCB, and two charges of 728 mg (2.78 mmol) triphenylphosphine in 5 mL ODCB (final polymer concentration 5.0 wt/vol %; final diene:Rh 280: 1). Following two reprecipitations from TCE into methanol and drying, 7.0 g (theo. yield 8.09 g, 87%) of a white solid was obtained. Characterization data is given in Table 4.

Comparative Example C18

Synthesis of HEDCPD Copolymer from EDCPD Copolymer Prepared in Example C9

An 8 g portion of the copolymer prepared in Example C9 (overall loading of 40.73 mmol DCPD units) was hydrogenated using a procedure identical to Example C12. The amounts of reagents used were 140 mL ODCB (to dissolve the copolymer), two charges of 68 mg (0.0734 mmol) Rh(PPh$_3$)$_3$Cl in 5 mL ODCB, and two charges of 664 mg (2.53 mmol) triphenylphosphine in 5 mL ODCB (final polymer concentration 5.0 wt/vol %; final diene:Rh 277:1). Following one reprecipitation from TCE into methanol and drying, 7.9 g (theo. yield 8.08 g, 98%) of a white solid was obtained. DSC analysis revealed a distinct T$_m$ in the expected temperature range for homo-polyethylene. GPC analysis also indicated a compositional inhomogeneity over the copolymer molecular weight distribution, as evidenced by a polarity inversion of the DRI signal to that for homo-polyethylene at the high-molecular-weight side of the distribution. Characterization data is given in Table 4.

Comparative Example C19

Synthesis of HEDCPD Copolymer from EDCPD Copolymer Prepared in Example C10

An 8 g portion of the copolymer prepared in Example C10 (overall loading of 37.21 mmol DCPD units) was hydrogenated using a procedure identical to Example C12. The amounts of reagents used were 140 mL ODCB (to dissolve the copolymer), two charges of 61 mg (0.0660 mmol) Rh(PPh$_3$)$_3$Cl in 5 mL ODCB, and two charges of 597 mg (2.28 mmol) triphenylphosphine in 5 mL ODCB (final polymer concentration 5.0 wt/vol %, cloudy solution; final diene: Rh 282:1). Following one reprecipitation from TCE into methanol and drying (some gels were observed during redissolution but could not be removed by filtration due to high solution viscosity), 8.0 g (theo. yield 8.07 g, 99%) of a white solid was obtained. DSC analysis revealed a distinct $T_m$ in the expected temperature range for homo-polyethylene. GPC analysis also indicated a compositional inhomogeneity over the copolymer molecular weight distribution, as evidenced by a polarity inversion of the DRI signal to that for homo-polyethylene at the high-molecular-weight side of the distribution. Characterization data is given in Table 4.

Comparative Example C20

Synthesis of HEDCPD Copolymer from EDCPD Copolymer Prepared in Example C11

An 8 g portion of the copolymer prepared in Example C11 (overall loading of 30.77 mmol DCPD units) was hydrogenated using a procedure identical to Example C12. The amounts of reagents used were 140 mL ODCB (to dissolve the copolymer), two charges of 51 mg (0.0550 mmol) Rh(PPh$_3$)$_3$Cl in 5 mL ODCB, and two charges of 498 mg (1.90 mmol) triphenylphosphine in 5 mL ODCB (final polymer concentration 5.0 wt/vol % with some gels observed; final diene:Rh 280:1). Following one reprecipitation from TCE into methanol and drying, 8 g (theo. yield 8.064 g, 99%) of a white solid was obtained. DSC analysis revealed a distinct $T_m$ in the expected temperature range for homo-polyethylene. GPC analysis also indicated a compositional inhomogeneity over the copolymer molecular weight distribution, as evidenced by a polarity inversion of the DRI signal to that for homo-polyethylene at the high-molecular-weight side of the distribution. Characterization data is given in Table 4.

TABLE 4

Properties of comparative HEDCPD copolymers prepared in Examples C12-C20.

| Ex. No. | Mole % HDCPD[a] | $T_g$[b] | $T_m$[b] | GPC $M_w$ (TCB vs. PS)[c] | GPC $M_n$ (TCB vs. PS)[c] | Resid. Lights (wt %)[a] |
|---|---|---|---|---|---|---|
| C12 | 40.3 | 145.9 | none | 193,790 | 66,230 | NA |
| C13 | 50.1 | 163.5 | none | 104,420 | 50,110 | ≦0.15 CH |
| C14 | 43.8 | 143.1 | none | 170,350 | 78,620 | ≦0.08 CH |
| C15 | 45.0 | 147.1 | none | 165,670 | 75,760 | ≦0.05 CH |
| C16 | 38.3 | 143.6 | none | 219,860 | 76,420 | NA |
| C17 | 35.6 | 141.0 | none | 250,250 | 69,510 | NA |
| C18 | 30.7[d] | 133.0 | 124.2[f] | NA[g] | NA[g] | NA, 0.07 mol % PPh$_3$ |
| C19 | 25.6[d] | hid.[e] | 123.0[f] | NA[g] | NA[g] | NA |
| C20 | 15.6[d] | 102.3 | 122.5[f] | NA[g] | NA[g] | NA |

[a]$^1$H NMR (CH = cyclohexane); NA = not available (data not obtained).
[b]By DSC, 2$^{nd}$ heat at 10° C./min heating rate; midpoint ($T_g$) or maximum ($T_m$).
[c]By GPC-DRI vs. polystyrene standards, in 1,2,4-trichlorobenzene at 135° C.. Unless indicated, samples exhibited an opposite polarity over the entire molecular weight distribution as compared to homo-polyethylene. Molecular weights are in g/mol.
[d]These values represent the entire sample (i.e., are not corrected for the presence of homo-polyethylene).
[e]$T_g$ overlapped by $T_m$.
[f]Estimated ΔH$_f$s for $T_m$ transitions: C18, 0.69 J/g; C19, ≧3.53 J/g; C20, 4.77 J/g.
[g]Not available. Sample showed a gradual inversion of DRI signal polarity over the molecular weight distribution, with the high end of the molecular weight distribution exhibiting the same polarity as homo-polyethylene.

Example 18

Synthesis of Epoxidized EDCPD (epoxy-EDCPD) Copolymer from ED CPD Copolymer Prepared in Example 1

An oven-dried 1 L three necked round bottom flask was fitted with a stirbar, thermometer, gas inlet/outlet, and addition funnel. A 5 g portion of the copolymer prepared in Example 1 (27.75 mmol DCPD units) and 500 mL CHCl$_3$ were added, and the flask was placed under a nitrogen purge. The polymer solution was stirred under nitrogen for 4 hours to effect dissolution (1.0 wt/vol % polymer concentration; some insolubles and gels were observed). The addition funnel was charged with 25.55 g formic acid (555 mmol, 20 eq.), which was added to the polymer solution over a 15 minute period, and subsequently with 3.3 g 30 wt % aqueous H$_2$O$_2$ (29.1 mmol, 1.05 eq.), added dropwise over a 10 minute period. No exotherm was observed. The polymer solution was stirred overnight at room temperature under nitrogen, after which time the solution was cloudy due to the presence of water in the CHCl$_3$. Subsequently, the solution was filtered through a 60 mesh metal sieve and then added to 3000 mL stirred MeOH. The precipitated polymer was collected by filtration, stirred in fresh methanol (500 mL) for 2 hours, re-collected by filtration, and dried in a vacuum oven at 40° C. for three days to give 5.12 g (theo. yield 5.45 g, 94%) of a fluffy white material. Characterization data is given in Table 5.

Spectral properties of a typical epoxy-EDCPD copolymer prepared in Examples 18-22: $^1$H NMR (d$_4$-ODCB or d$_2$-TCE, 120° C.): δ 3.4 and 3.3 (each s, total 2 H, epoxy CHO), 2.4 and 2.3 (two overlapped s, total 2 H, DCPD bridgeheads), 2.2 and 2.15 (two overlapped peaks, total 1 H), 2.0-0.9 (m with main peaks at 1.95, 1.9, 1.8, 1.7, 1.5, 1.3, 1.2, 1.1) (7 H from HDCPD+4 H from ethylene units). The characteristic DCPD olefin (5.6 and 5.5 ppm) and DCPD cyclopentenyl bridgehead (3.1 and 2.5 ppm) peaks of the precursor EDCPD materials were absent. $^{13}$C{$^1$H} NMR (d$_2$-TCE, 120° C.): δ 61.2 and 60.1 (each s, total 2 C, epoxy CHO), 48.4 (s, 1C), 47.5-46.0 (br s or m of typically three peaks, 1 C), 45.5 (s, 1 C), 45.0-43.5 (br s or m of typically three peaks, 1 C) (DCPD CH), 40.4 and 39.0, 39.7 and 38.3 (two overlapped doublets, each 1 C, DCPD CH), 37.3 (s, 1 C, DCPD CH$_2$), 30.0 (br s or m, 2 C from ethylene units), 28.2 (s, 1 C, DCPD CH$_2$) (some spectra showed additional splitting). The characteristic DCPD olefin (133 and 131 ppm) and DCPD allylic bridgehead (54 ppm) peaks of the precursor EDCPD materials were absent. When observed, formate hemiesters ([—CH(OH)CH(OC(=O)H)—] units) exhibited additional peaks in the $^1$H NMR spectrum at 8.1-8.0 (OC(=O)H) and 5.0 (CH(OC(=O)H) ppm (CHOH proton unassigned) and/or in the $^{13}$C{$^1$H} NMR spectrum at ~160 (C=O, 1 C) and 76-80 (CH(OC(=O)H and CHOH) ppm. When observed, diol (—CH(OH)CH(OH)—) units exhibited additional peaks in the $^{13}$C{$^1$H} NMR spectrum at 76-80 ppm (2 C, CHOH) ppm. IR (cast film from CHCl$_3$ on NaCl): 2996 (m), 2933 (vs), 2851 (m), 1464 (m), 1443 (m), 1386 (m), 1364 (sh), 1306 (w), 1287 (sh), 1272 (w), 1263 (w), 1241 (w), 1220 (w), 1194 (w), 1180 (w), 1121 (w), 1069 (w), 1043 (w), 1017 (w), 1003 (w), 961 (w), 921 (w), 833 (s, $v_{epoxide\ C=O}$), 809 (w), 754 (w), 729 (w), 693 (w), 665 (sh) cm$^{-1}$. The characteristic bands seen in the precursor EDCPD copolymer at 3038 (m, $v_{olefin\ C-H}$) and 1608 (w, $v_{C=C}$) were absent.

Example 19

Synthesis of Epoxy-EDCPD Copolymer from EDCPD Copolymer Prepared in Example 2

A 5 g portion of the copolymer prepared in Example 2 (28.40 mmol DCPD units) was epoxidized using a procedure identical to Example 18. The amounts of reagents used were 500 mL CHCl$_3$ (1.0 wt/vol % polymer concentration; some insolubles), 26.14 g formic acid (568 mmol, 20 eq.), and 3.38 g 30 wt % aqueous H$_2$O$_2$ (29.8 mmol, 1.05 eq.). Following isolation and drying, a 5.26 g portion (theo. yield 5.50 g, 96%) of a fluffy white material was obtained. Characterization data is given in Table 5.

Example 20

Synthesis of Epoxy-EDCPD Copolymer from EDCPD Copolymer Prepared in Example 4

A 2 g portion of the copolymer prepared in Example 4 (9.80 mmol DCPD units) was epoxidized using a procedure similar to Example 18. The amounts of reagents used were 100 mL $CHCl_3$ (2.0 wt/vol % polymer concentration; some gels), 9.04 g formic acid (196 mmol, 20 eq.), and 2.23 g 30 wt % aqueous $H_2O_2$ (19.7 mmol, 2.0 eq.). The product solution did not require filtration through a 60 mesh sieve. Following isolation and drying, a 2.05 g portion (theo. yield 2.15 g, 95%) of a fluffy white material was obtained; the material was subsequently redried under vacuum at 50° C. for 3 days to remove residual solvent. Characterization data is given in Table 5.

Example 21

Synthesis of Epoxy-EDCPD Copolymer from EDCPD Copolymer Prepared in Example 5

A 5.0 g portion of the copolymer prepared in Example 5 (26.11 mmol DCPD units) was epoxidized using a procedure similar to Example 18. The amounts of reagents used were 250 mL $CHCl_3$ (2.0 wt/vol % polymer concentration), 26.145 g formic acid (568 mmol, 21.8 eq.), and 6.441 g 30 wt % aqueous $H_2O_2$ (56.8 mmol, 2.2 eq.). Following precipitation of polymer into 1 L MeOH, isolation, and drying under vacuum (0.1 mm Hg) at 60° C. overnight, a 5.47 g portion (theo. yield 5.42 g, quantitative) of a fluffy white material was obtained. Characterization data is given in Table 5.

Example 22

Synthesis of Epoxy-ED CPD Copolymer from EDCPD Copolymer Prepared in Example 6

A 5.9 g portion of the copolymer prepared in Example 6 (33.88 mmol DCPD units) was epoxidized using a procedure similar to Example 20. The amounts of reagents used were 295 mL $CHCl_3$ (2.0 wt/vol % polymer concentration), 31.48 g formic acid (684 mmol, 20.2 eq.), and 7.75 g 30 wt % aqueous $H_2O_2$ (68.3 mmol, 2.0 eq.). Following isolation and drying, a 6.23 g portion (theo. yield 6.44 g, 97%) of a fluffy white material was obtained. Characterization data is given in Table 5.

TABLE 5

Properties of epoxy-EDCPD copolymers prepared in Examples 18-22.

| Ex. No. | Total mole % DCPD (% epoxidized)[a] | $T_g$[b] | $T_m$[b] | GPC $M_w$ (TCB vs. PS)[c] | GPC $M_n$ (TCB vs. PS)[c] | Notes |
|---|---|---|---|---|---|---|
| 18 | 36.3 (99.5) | 145.4 | none | 185,150 | 47,740 | |
| 19 | 38.2 (98.9) | 151.2 | none | 271,110 | 66,500 | |
| 20 | 27.5 (100) | 115.1 | none | 366,300 | 95,010 | 2.8 mole % diol[d] |
| 21 | 32.0 (100) | 133.0 | none | 389,030 | 124,400 | 2.7 mole % diol[d] |
| 22 | 40.7 (100) | 166.1 | none | 200,990 | 74,670 | |

[a] 1H NMR (CH = cyclohexane).
[b] By DSC, 2nd heat at 10° C./min heating rate; midpoint ($T_g$) or maximum ($T_m$).
[c] By GPC-DRI vs. polystyrene standards, in 1,2,4-trichlorobenzene at 135° C.. Molecular weights are in g/mol.
[d] The mole % diol is included in the % of DCPD epoxidized.

Comparative Example C21

Synthesis of Epoxy-EDCPD Copolymer from EDCPD Copolymer Prepared in Example C2

Using a procedure similar to that described in Example 18, an oven-dried, 3 L three necked round bottom flask was fitted with a mechanical stirrer, thermometer, and addition funnel and placed under a nitrogen purge. A 20 g portion of the copolymer prepared in Example C2 (118.7 mmol DCPD units) was added to the flask followed by 2.0 L $CHCl_3$. The mixture was stirred at room temperature for 2 hours to dissolve the polymer. The resultant solution was slightly hazy, but there were no apparent gels. The addition funnel was charged with 109.36 g formic acid (2.376 mol, 20 eq.), which was added to the polymer solution over a 15 minute period, and subsequently with 14.146 g 30 wt % aqueous $H_2O_2$ (124.74 mmol, 1.05 eq.), added dropwise over a 10 minute period. No exotherm was observed. The polymer solution was stirred for 18 hours at room temperature under N2, after which time cloudiness had increased due to the presence of water. Subsequently, the solution was divided into four portions (each approximately 530 mL), each of which was added while stirring to a 4 L beaker containing 3.0 L methanol. The precipitated polymers were collected by filtration, stirred in fresh methanol (530 mL) for 2 hours, re-collected by filtration, combined, and dried in a vacuum oven overnight at 40° C. to give 20 g (theo. yield 21.9 g; 91%) of a fluffy white material. Characterization data is given in Table 6.

Comparative Example C22

Synthesis of Epoxy-EDCPD Copolymer from EDCPD Copolymer Prepared in Example C3

A procedure similar to Example C21 was carried out in a 12 L four-necked round bottomed flask. The amounts of reagents used were 85 g of the copolymer prepared in Example C3 (504.5 mmol DCPD units) in 8.5 L $CHCl_3$, 464.78 g formic acid (10.1 mol, 20 eq., added over a 75 minute period), and 60.12 g of 30 wt % aqueous $H_2O_2$ (530 mmol, 1.05 eq., added over a 25 minute period). The polymer was precipitated by adding the polymer solution in portions to methanol as described in Example C21 (a total of 12 L was used), similarly collected, and dried in a vacuum oven for 60 hours at 50° C. to give 89.5 g (theo. yield 93.1 g; 96%) of a white, powdery material. Characterization data is given in Table 6.

Comparative Example C23

Synthesis of Epoxy-EDCPD Copolymer from EDCPD Copolymer Prepared in Example C4

A procedure similar to Example C21 was carried out in a 12 L four-necked round bottomed flask heated to 50° C. using a heating mantle. The amounts of reagents used were: 97.9 g of the copolymer prepared in Example C4 (580.0 mmol DCPD units) in 9.8 L $CHCl_3$, 533.95 g formic acid (11.6 mol, 20 eq., added over a 90 minute period), and 72.35 g of 30 wt % aqueous $H_2O_2$ (0.638 mol, 1.1 eq., added over a 30 minute period). After $H_2O_2$ addition was complete, the solution was stirred at 50° C. for 6 hours and at room temperature for an additional 18 hours. The polymer was precipitated and dried as described in Example C21 to give 100 g (theo. yield 107.2 g; 93%) of a white, powdery material. Characterization data is given in Table 6.

TABLE 6

Properties of comparative epoxy-EDCPD copolymers prepared in Examples C21-C23.

| Ex. No. | Total mole % DCPD (% epoxidized)[a] | $T_g$[b] | $T_m$[b] | GPC $M_w$ (TCB vs. PS)[c] | GPC $M_n$ (TCB vs. PS)[c] | Notes |
|---|---|---|---|---|---|---|
| C21 | 44.9 (97.3) | 188.3 | none | 78,770 | 29,160 | |
| C22 | 44.3 (97.5)[e] | 183.4 | none | 127,020 | 52,580 | |
| C23 | 41.9 (100) | 181.7 | none | 126,740 | 50,010 | 0.7 mole % formate hemiester[d] |

[a] 1H NMR (CH = cyclohexane).
[b] By DSC, 2nd heat at 10° C./min heating rate; midpoint ($T_g$) or maximum ($T_m$).
[c] By GPC-DRI vs. polystyrene standards, in 1,2,4-trichlorobenzene at 135° C.. Molecular weights are in g/mol.
[d] The mole % formate ester is included in the % of DCPD epoxidized.
[e] Average of values obtained in CDCl3 and TCE-d2.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. An ethylene-dicyclopentadiene copolymer composition comprising copolymers derived from ethylene and dicyclopentadiene (DCPD) co-monomers, wherein said copolymer composition:
   a) has a DCPD-derived comonomer unit content of from about 25 mole % to about 45 mole %;
   b) has an Mw/Mn of from 1.96 to 2.34, and a Number Average Molecular Weight, Mn, of 251,610 g/mol or more;
   c) comprises amorphous material and has a glass transition temperature, $T_g$, which is from about 85° C. to about 129° C.; and which has a relationship to the mole % DCPD defined by the equation $T_g$ (in ° C.)≧[(mole % DCPD×3.142)−4.67]; and
   d) comprises no significant amount of crystalline polyethylene homopolymer or crystallizable polyethylene segments within said ethylene-dicyclopentadiene copolymers.

2. A copolymer composition according to claim 1 which has a glass transition temperature, $T_g$, which is from about 87° C. to about 129° C.

3. A copolymer composition according to claim 1 which has a DCPD-derived comonomer unit content of from about 26 mole % to about 43 mole %.

4. A copolymer composition according to claim 1 which has a glass transition temperature, $T_g$, which is from about 88° C. to about 128.5° C.

5. A derivatized copolymer composition wherein an ethylene-dicyclopentadiene copolymer composition according to claim 1 is derivatized by hydrogenation, and/or by epoxidation of the double bond in some or all of the cyclic co-monomers in said copolymer composition.

6. A hydrogenated ethylene-dicyclopentadiene copolymer composition comprising hydrogenated copolymers derived from ethylene and dicyclopentadiene (DCPD) co-monomers, wherein said hydrogenated copolymer composition:
   a) has a DCPD-derived comonomer unit content of from about 25 mole % to about 45 mole %;
   b) has a Weight Average Molecular Weight, $M_w$, of greater than about 277,590 g/mol, as measured by Gel Permeation Chromatography versus polystyrene standards;
   c) comprises amorphous material and has a glass transition temperature, $T_g$, of from about 85° C. to about 129° C.;
   d) has from about 70% to 100% of the double bonds in the ethylene-dicyclopentadiene copolymers hydrogenated; and
   (e) has one of:
      (i) no detectable crystalline melting point, $T_m$; and
      (ii) a second heat differential scanning calorimeter $T_m$ with a heat of fusion of less than 0.5 J/g,
   wherein prior to hydrogenation the ethylene-dicyclopentadiene copolymer:
      1) has a DCPD-derived comonomer unit content of from about 25 mole % to about 45 mole %;
      2) has an Mw/Mn of from 1.96 to 2.34, and a Number Average Molecular Weight, Mn, of 251,610 g/mol or more;
      3) comprises amorphous material and has a glass transition temperature, $T_g$, which is from about 85° C. to about 129° C.; and which has a relationship to the mole % DCPD defined by the equation $T_g$ (in ° C.)≧[(mole % DCPD×3.142)−4.67]; and
      4) comprises no significant amount of crystalline polyethylene homopolymer or crystallizable polyethylene segments within said ethylene-dicyclopentadiene copolymers.

7. A hydrogenated ethylene-dicyclopentadiene copolymer composition according to claim 6 which comprises no significant amount of crystalline polyethylene homopolymer or crystallizable polyethylene segments within said hydrogenated ethylene-dicyclopentadiene copolymers.

8. A hydrogenated ethylene-dicyclopentadiene copolymer composition according to claim 6 which has a glass transition temperature, $T_g$, of from about 87° C. to about 129° C.

9. A hydrogenated ethylene-dicyclopentadiene copolymer composition according to claim 6 which has a DCPD-derived comonomer unit content of from about 26 mole % to about 43 mole %.

10. A hydrogenated ethylene-dicyclopentadiene copolymer composition according to claim 6 which has a glass transition temperature, $T_g$, of from about 88° C. to about 128.5° C.

11. An epoxidized ethylene-dicyclopentadiene copolymer composition comprising epoxidized copolymers derived from ethylene and dicyclopentadiene (DCPD) co-monomers, wherein said epoxidized copolymer composition:
   a) has a DCPD-derived comonomer unit content of from 32.0 mole % to about 45 mole %;
   b) has a Weight Average Molecular Weight, $M_w$, of greater than about 200,990 g/mol, as measured by Gel Permeation Chromatography versus polystyrene standards;
   c) comprises amorphous material and has a glass transition temperature, $T_g$, of from 133° C. to about 175° C.; and
   d) has from about 50% to 100% of the double bonds in the epoxidized ethylene-dicyclopentadiene copolymers converted to oxirane rings via epoxidation; and
   (e) has one of:
      (i) no detectable crystalline melting point, $T_m$; and
      (ii) a second heat differential scanning calorimeter $T_m$ with a heat of fusion of less than 0.5 J/g,
   wherein prior to epoxidation the ethylene-dicyclopentadiene copolymer:

1) has a DCPD-derived comonomer unit content of from about 32 mole % to about 45 mole %;
2) has an Mw/Mn of from 1.96 to 2.34, and a Number Average Molecular Weight, Mn, of 251,610 g/mol or more;
3) comprises amorphous material and has a glass transition temperature, $T_g$, which is from about 85° C. to about 129° C.; and which has a relationship to the mole % DCPD defined by the equation $T_g$ (in ° C.)$\geq$[(mole % DCPD$\times$3.142)−4.67]; and
4) comprises no significant amount of crystalline polyethylene homopolymer or crystallizable polyethylene segments within said ethylene-dicyclopentadiene copolymers.

12. An epoxidized ethylene-dicyclopentadiene copolymer composition according to claim 11 which comprises no significant amount of crystalline polyethylene homopolymer or crystallizable polyethylene segments within said epoxidized ethylene-dicyclopentadiene copolymers.

13. An epoxidized ethylene-dicyclopentadiene copolymer composition according to claim 11 which has a glass transition temperature, $T_g$, of from 145.4° C. to about 175° C.

14. An epoxidized ethylene-dicyclopentadiene copolymer composition according to claim 11 which has a DCPD-derived comonomer unit content of from 36.3 mole % to about 43 mole %.

15. An epoxidized ethylene-dicyclopentadiene copolymer composition according to claim 11 which has a glass transition temperature, $T_g$, of from 151.2° C. to about 170° C.

16. An epoxidized ethylene-dicyclopentadiene copolymer composition according to claim 11 which contains less than 5 mole % of DCPD units bearing formate hemiester and/or diol substituents.

17. A process for preparing an ethylene/dicyclopentadiene copolymer composition according to claim 1, which process comprises:
a) contacting ethylene with a polymerization mixture comprising about 4.0 molar or greater of dicyclopentadiene comonomer, with an activated metallocene catalyst under polymerization conditions including a temperature of from about 25° C. to about 110° C. and an ethylene pressure of from about 101.4 kPa (14.7 psig) to about 4826.3 kPa (700 psig) for a period of time sufficient to form ethylene-dicyclopentadiene copolymers within said polymerization mixture; and
b) recovering or further reacting said ethylene-dicyclopentadiene copolymers from or within said polymerization mixture;

wherein said metallocene catalyst is represented by the formula:

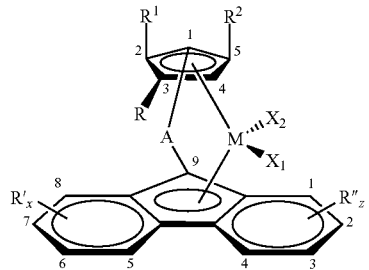

wherein
M is a Group 3, 4, 5 or 6 transition metal atom, a lanthanide metal atom, or an actinide metal atom;
R is not hydrogen and is a hydrocarbyl or substituted hydrocarbyl group;
$R^1$, $R^2$, and each R' and R" is, independently, hydrogen, a hydrocarbyl group, or a substituted hydrocarbyl group;
"x" is 0, 1, 2, 3, or 4;
"z" is 0, 1, 2, 3, or 4;
A is a bridging group; and
$X_1$ and $X_2$ are ligands associated with the metal M,
wherein the recovered copolymer of step b) is an ethylene-dicyclopentadiene copolymer derived from ethylene and dicyclopentadiene (DCPD) co-monomers, wherein said copolymer composition:
a) has a DCPD-derived comonomer unit content of from about 25 mole % to about 45 mole %;
b) has an Mw/Mn of from 1.96 to 2.34, and a Number Average Molecular Weight, Mn, of 251,610 g/mol or more;
c) comprises amorphous material and has a glass transition temperature, $T_g$, which is from about 85° C. to about 129° C.; and which has a relationship to the mole % DCPD defined by the equation $T_g$ (in ° C.)$\geq$[(mole % DCPD$\times$3.142)−4.67]; and
d) comprises no significant amount of crystalline polyethylene homopolymer or crystallizable polyethylene segments within said ethylene-dicyclopentadiene copolymers.

18. A process according to claim 17 wherein said polymerization mixture comprises greater than about 4.5 molar concentration of dicyclopentadiene.

19. A process according to claim 18 wherein M is zirconium or hafnium.

20. A process according to claim 19 wherein said R substituent is methyl, ethyl, propyl, isopropyl, n-butyl, isobutyl or tert-butyl.

21. A process according to claim 18 wherein said metallocene catalyst is activated by the presence of a co-catalyst activator.

22. A process according to claim 21 wherein said metallocene catalyst is selected from the group consisting of:
μ-(CH$_3$)$_2$C(3-methylcyclopentadienyl)(9-fluorenyl)M(R)$_2$,
μ-(CH$_3$)$_2$C(3-isopropylcyclopentadienyl)(9-fluorenyl)M(R)$_2$,
μ-(CH$_3$)$_2$C(3-tert-butylcyclopentadienyl)(9-fluorenyl)M(R)$_2$,
μ-(CH$_3$)$_2$C(3-phenylcyclopentadienyl)(9-fluorenyl)M(R)$_2$,
μ-(CH$_3$)$_2$Si(3-methylcyclopentadienyl)(9-fluorenyl)M(R)$_2$,
μ-(CH$_3$)$_2$Si(3-isopropylcyclopentadienyl)(9-fluorenyl)M(R)$_2$,
μ-(CH$_3$)$_2$Si(3-tert-butylcyclopentadienyl)(9-fluorenyl)M(R)$_2$,
μ-(CH$_3$)$_2$Si(3-phenylcyclopentadienyl)(9-fluorenyl)M(R)$_2$,
μ-CH$_2$(3-methylcyclopentadienyl)(9-fluorenyl)M(R)$_2$,
μ-CH$_2$(3-isopropylcyclopentadienyl)(9-fluorenyl)M(R)$_2$,
μ-CH$_2$(3-tert-butylcyclopentadienyl)(9-fluorenyl)M(R)$_2$,
μ-CH$_2$(3-phenylcyclopentadienyl)(9-fluorenyl)M(R)$_2$,
μ-(C$_6$H$_5$)$_2$C(3-methylcyclopentadienyl)(9-fluorenyl)M(R)$_2$,
μ-(C$_6$H$_5$)$_2$C(3-isopropylcyclopentadienyl)(9-fluorenyl)M(R)$_2$,
μ-(C$_6$H$_5$)$_2$C(3-tert-butylcyclopentadienyl)(9-fluorenyl)M(R)$_2$,
μ-(C$_6$H$_5$)$_2$C(3-phenylcyclopentadienyl)(9-fluorenyl)M(R)$_2$, μ-(para-triethylsilylphenyl)$_2$C(3-methylcyclopentadienyl)-(9-fluorenyl)M(R)$_2$ and μ-(para-triethylsilylphenyl)$_2$C(3-methylcyclopentadienyl)-(2,7-di-tert-butyl-9-fluorenyl)M(R)$_2$ wherein M is Zr or Hf, and R is Cl or CH$_3$.

23. A process according to claim 22 wherein said co-catalyst activator is selected from the group consisting of alumoxanes, modified alumoxanes, and ionic stoichiometric activators selected from the group consisting of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis (trifluoromethyl)phenyl)borate, triphenylcarbenium tetrakis(perfluoro-naphthyl)borate, triphenylcarbenium tetrakis(perfluorobiphenyl)borate, triphenyl-carbenium tetrakis(3,5-bis (trifluoromethyl)phenyl)borate, and triphenyl-carbenium tetrakis(perfluorophenyl)borate.

24. A process according to claim 23 wherein the ethylene pressure ranges from about 344.7 kPa (50 psig) to about 4136.9 kPa (600 psig).

25. A process according to claim 17 wherein the ethylene-dicyclopentadiene copolymer composition prepared is contacted, either after recovery from or in situ within said polymerization mixture, with a derivatizing agent to bring about hydrogenation and/or epoxidation of the double bond in some or all of the cyclic co-monomers in said copolymer.

26. A process according to claim 25 wherein said prepared ethylene-dicyclopentadiene copolymer composition is contacted with hydrogen in the presence of a hydrogenation catalyst under hydrogenation reaction conditions of temperature and pressure suitable to effect hydrogenation of from about 70% to 100% of the double bonds within said ethylene-dicyclopentadiene copolymer composition.

27. A process according to claim 26 wherein said hydrogenation catalyst is selected from the group consisting of RuClH(CO)(PPh$_3$)$_3$, Co(acac)$_3$/Bu$_3$Al, nickel silica alumina, nickel/tungsten sulfides, Co-octanoate/Et$_3$Al, platinum/palladium, Pd/C, Rh(PPh$_3$)$_3$Cl and combinations thereof (where Ph is phenyl, acac is acetyl acetonoate, Bu is butyl, and Et is ethyl), and wherein said hydrogenation reaction conditions include hydrogenation temperatures ranging from about 45° C. to about 180° C., and hydrogen pressures ranging from about 1379.0 kPa (200 psig) to about 11031.6 kPa (1600 psig).

28. A process according to claim 25 wherein said prepared ethylene-dicyclopentadiene copolymer composition is contacted in a solvent with a peroxide or peracid epoxidizing agent under epoxidation reaction conditions suitable to effect oxirane formation at from about 50% to 100% of the double bonds within said ethylene-dicyclopentadiene copolymer composition.

29. A process according to claim 28 wherein said solvent is selected from toluene and chloroform, said epoxidizing agent is selected from 3-chloroperbenzoic acid and combinations of hydrogen peroxide and formic acid, and said epoxidation reaction conditions include epoxidation temperatures ranging from about 0° C. to about 75° C.

30. A copolymer composition according to claim 1 which has an Mn of 256,950 g/mol or more.

31. A copolymer composition according to claim 1 which has an Mn of 280,870 g/mol or more.

32. A copolymer composition according to claim 1 which has an Mn of 377,630 g/mol or more.

33. A process according to claim 28 wherein the epoxidized copolymer composition:
   a) has a DCPD-derived comonomer unit content of from 32.0 mole % to about 45 mole %;
   b) has a Weight Average Molecular Weight, $M_w$, of greater than about 200,990 g/mol;
   c) comprises amorphous material and has a glass transition temperature, $T_g$, of from 133° C. to about 175° C.; and
   d) has from about 50% to 100% of the double bonds in the epoxidized ethylene-dicyclopentadiene copolymers converted to oxirane rings via epoxidation; and
   (e) has one of:
      (i) no detectable crystalline melting point, $T_m$; and
      (ii) a second heat differential scanning calorimeter $T_m$ with a heat of fusion of less than 0.5 J/g.

34. An ethylene-dicyclopentadiene copolymer composition comprising copolymers derived from ethylene and dicyclopentadiene (DCPD) co-monomers, wherein said copolymer composition:
   a) has a DCPD-derived comonomer unit content of from about 25 mole % to about 45 mole %;
   b) has a Weight Average Molecular Weight, $M_w$, of 588,620 g/mol or more and a Number Average Molecular Weight, Mn, of 251,610 g/mol or more;
   c) comprises amorphous material and has a glass transition temperature, $T_g$, which is from about 85° C. to about 129° C.; and which has a relationship to the mole % DCPD defined by the equation $T_g$ (in ° C.)≧[(mole % DCPD×3.142)−4.67]; and
   d) comprises no significant amount of crystalline polyethylene homopolymer or crystallizable polyethylene segments within said ethylene-dicyclopentadiene copolymers.

35. An epoxidized ethylene-dicyclopentadiene copolymer composition according to claim 11 which has a CRYSTAF solubility readings of 90% or greater.

* * * * *